US011329525B2

(12) United States Patent
Okazaki et al.

(10) Patent No.: US 11,329,525 B2
(45) Date of Patent: May 10, 2022

(54) ROTATING ELECTRIC MACHINE

(71) Applicant: Mitsubishi Electric Corporation, Tokyo (JP)

(72) Inventors: Kodai Okazaki, Tokyo (JP); Ryuichi Takiguchi, Tokyo (JP); Shinichi Yamaguchi, Tokyo (JP); Tomoya Uchimura, Tokyo (JP); Shunta Kashima, Tokyo (JP); Takashi Umeda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 233 days.

(21) Appl. No.: 16/614,389

(22) PCT Filed: Jul. 19, 2017

(86) PCT No.: PCT/JP2017/026112
§ 371 (c)(1),
(2) Date: Nov. 18, 2019

(87) PCT Pub. No.: WO2019/016893
PCT Pub. Date: Jan. 24, 2019

(65) Prior Publication Data
US 2020/0185987 A1 Jun. 11, 2020

(51) Int. Cl.
*H02K 1/27* (2022.01)
*H02K 1/14* (2006.01)
(Continued)

(52) U.S. Cl.
CPC ............... *H02K 1/276* (2013.01); *H02K 1/14* (2013.01); *H02K 1/16* (2013.01); *H02K 1/28* (2013.01); *H02K 15/03* (2013.01)

(58) Field of Classification Search
CPC ............ H02K 1/276; H02K 1/14; H02K 1/16; H02K 1/28; H02K 15/03; H02K 21/14;
(Continued)

(56) References Cited

U.S. PATENT DOCUMENTS

| 2010/0045131 A1* | 2/2010 | Li ........................ H02K 21/222 310/156.01 |
| 2012/0025534 A1* | 2/2012 | Miyamoto ........... H02K 1/2746 290/55 |

FOREIGN PATENT DOCUMENTS

| JP | 2009-118704 A | 5/2009 |
| JP | 2012-249386 A | 12/2012 |
| JP | 2014-183691 A | 9/2014 |

OTHER PUBLICATIONS

International Search Report and Written Opinion dated Oct. 17, 2017 for PCT/JP2017/026112 filed on Jul. 19, 2017, 8 pages including English Translation of the International Search Report.

* cited by examiner

*Primary Examiner* — Thomas Truong
(74) *Attorney, Agent, or Firm* — Xsensus LLP

(57) ABSTRACT

Provided is a rotating electric machine, including: a stator including: an annular core back; and a plurality of teeth projecting in a radial direction from the core back and being arranged in a circumferential direction, the plurality of teeth having slots each formed between the plurality of teeth adjacent to each other in the circumferential direction; and a rotor including: an annular rotor core which is arranged coaxially with the stator through a magnetic gap; and a plurality of magnetic poles arranged on the rotor core in the circumferential direction, wherein the rotor core includes a plurality of segment cores formed by dividing the rotor core in the circumferential direction with at division surfaces, and wherein the number of segments of the rotor core is different (Continued)

from a divisor and a multiple of the greatest common divisor of the number of poles of the rotor and the number of slots.

8 Claims, 25 Drawing Sheets

(51) Int. Cl.
*H02K 1/276* (2022.01)
*H02K 1/16* (2006.01)
*H02K 1/28* (2006.01)
*H02K 15/03* (2006.01)

(58) Field of Classification Search
CPC ............. H02K 2213/03; H02K 1/2746; H02K 1/2766; H02K 3/28
See application file for complete search history.

COMPARATIVE EXAMPLE

ROTATING ELECTRIC MACHINE

CROSS-REFERENCE TO RELATED APPLICATION

The present application is based on PCT filing PCT/JP2017/026112, filed Jul. 19, 2017, the entire contents of which are incorporated herein by reference.

TECHNICAL FIELD

The present invention relates to a rotating electric machine, which is to be applied to, for example, a motor of a hoisting machine of an elevator.

BACKGROUND ART

For a rotor of a related-art rotating electric machine, a rotor core is manufactured by laminating steel sheets having been punched out in an annular shape. An inner peripheral portion of the annular steel sheet having been punched out is wasted, and a yield of a material is degraded.

In view of such a circumstance, there have been proposed related-art rotating electric machines for which an annular rotor core is manufactured by arranging segment cores, which are each manufactured by laminating steel sheets having been punched out in an arc shape, in a circumferential direction, to thereby improve a yield of a material of the rotor core (see, for example, Patent Literatures 1 and 2).

CITATION LIST

Patent Literature

[PTL 1] JP 2012-249386 A
[PTL 2] JP 2014-183691 A

SUMMARY OF INVENTION

Technical Problem

In the related-art rotating electric machines described in Patent Literatures 1 and 2, the rotor core is divided into a plurality of segment cores. Therefore, a harmonic component of a magnetomotive force caused by division of the rotor core is generated in a magnetic gap defined between a stator and a rotor. Further, an interaction between the harmonic component of the magnetomotive force and rotating magnetic fields generated by a stator coil generates a torque ripple.

In the related-art rotating electric machine described in Patent Literature 1, the number of poles of the rotor is 72, the number of slots of the stator is 156, and the number of segments of the rotor core is 12. Further, in the related-art rotating electric machine described in Patent Literature 2, the number of poles of the rotor is 4, the number of slots of the stator is 6, and the number of segments of the rotor core is 4. As described above, in the related-art rotating electric machines described in Patent Literatures 1 and 2, the number of segments of the rotor core matches with the greatest common divisor of the number of rotor poles and the number of slots, or is a multiple of the greatest common divisor. Therefore, there is a problem in that the torque ripple generated by the harmonic component of the magnetomotive force is superimposed on the torque ripple generated by the rotating magnetic fields, with the result that the torque ripple is increased.

For a rotating electric machine applied to a hoisting machine of an elevator, downsizing is required so that the hoisting machine can be installed in a hoistway. Further, a large output is required for hoisting a car, and hence a thin structure which is increased in radial dimension and reduced in axial dimension is required. As a result, the number of segments of the rotor core is increased, and the torque ripple becomes more liable to be generated. Further, the torque ripple generated in the rotating electric machine is transmitted to a car through a rope, and may give discomfort to a passenger in the car.

The present invention has been made to solve the problem described above, and has an object to obtain a rotating electric machine which is capable of suppressing an increase in torque ripple caused by division of a rotor core in a circumferential direction.

Solution to Problem

According to the present invention, there is provided a rotating electric machine, including: a stator including: an annular core back; and a plurality of teeth projecting in a radial direction from the core back and being arranged in a circumferential direction, the plurality of teeth having slots each formed between the plurality of teeth adjacent to each other in the circumferential direction; and a rotor including: an annular rotor core which is arranged coaxially with the stator through a magnetic gap and is rotatable; and a plurality of magnetic poles arranged on the rotor core in the circumferential direction, wherein the rotor core includes a plurality of segment cores formed by dividing the rotor core in the circumferential direction with at division surfaces, and wherein the number of segments of the rotor core is different from a divisor and a multiple of the greatest common divisor of the number of poles of the rotor and the number of slots.

Advantageous Effects of Invention

According to the present invention, the number of segments of the rotor core is different from a divisor or a multiple of the greatest common divisor of the number of magnetic poles and the number of slots, and hence the increase in torque ripple caused by the division of the rotor core is suppressed.

DESCRIPTION OF EMBODIMENTS

First Embodiment

Figure 1:
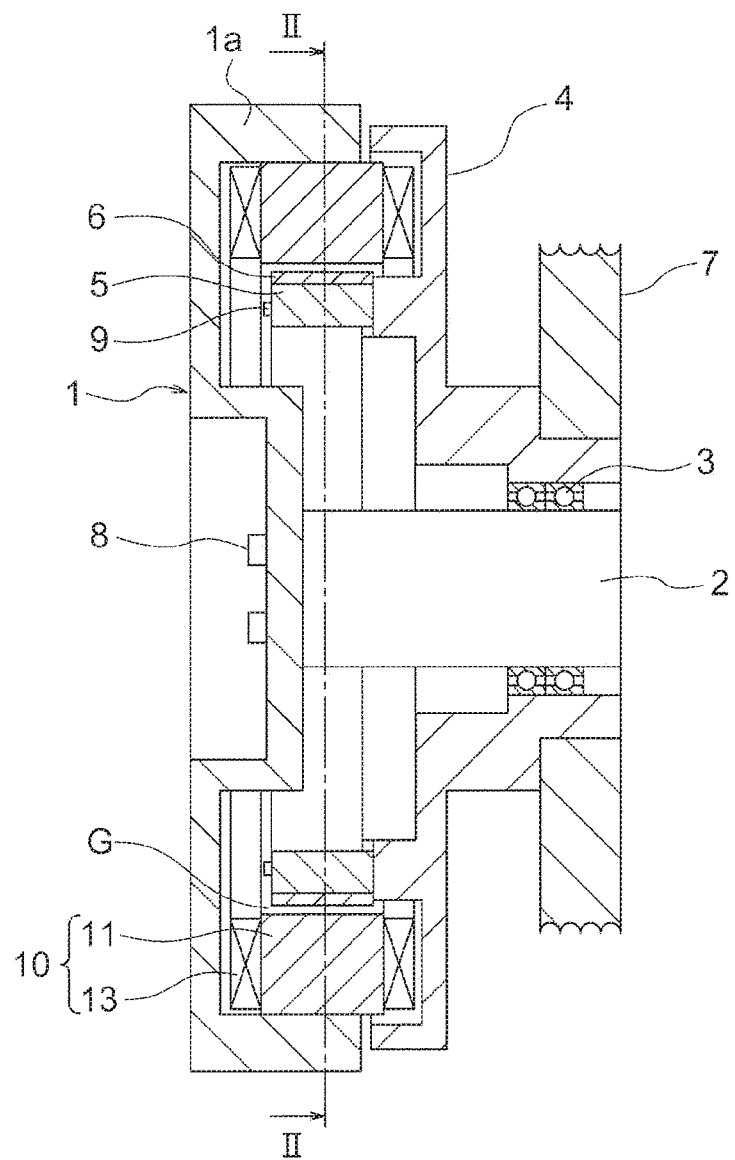
FIG. 1 is a sectional view for illustrating a hoisting machine of an elevator to which a rotating electric machine according to a first embodiment of the present invention is applied.
Figure 2:
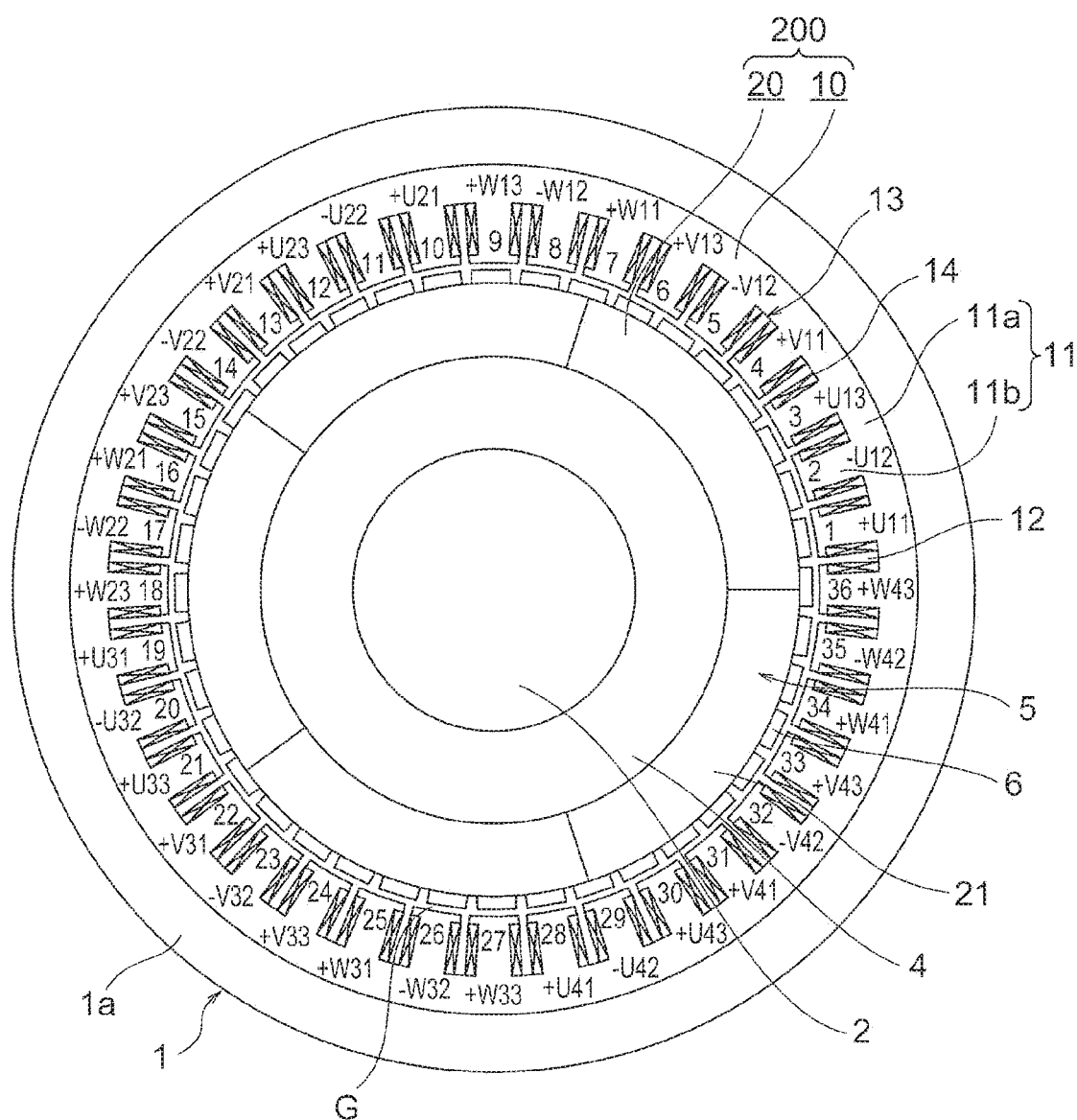
FIG. 2 is a sectional view taken along the line II-II of FIG. 1 as viewed from the direction indicated by the arrows.
Figure 3:
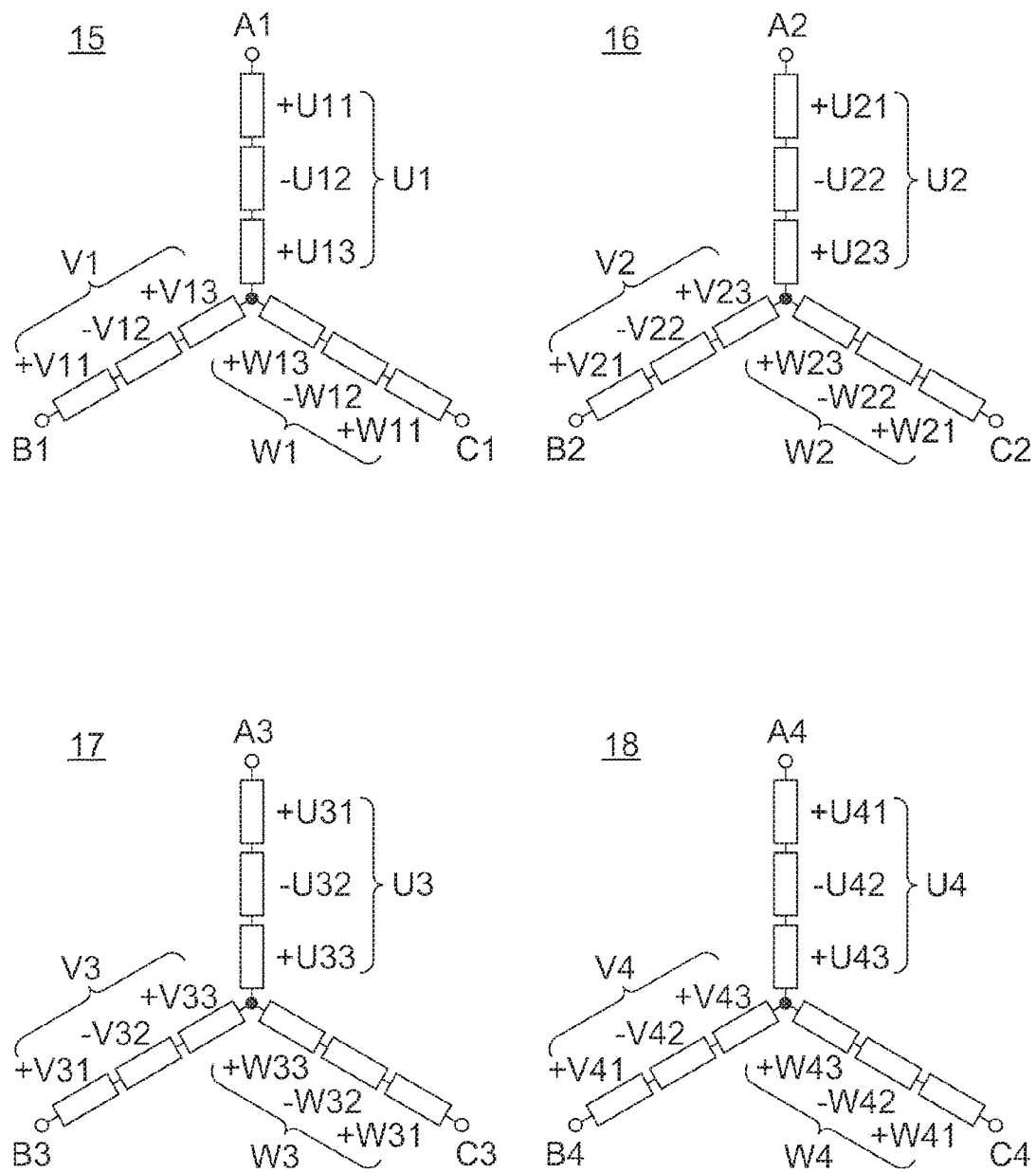
FIG. 3 is a wire connection diagram of stator coils in the rotating electric machine according to the first embodiment of the present invention.
Figure 4:
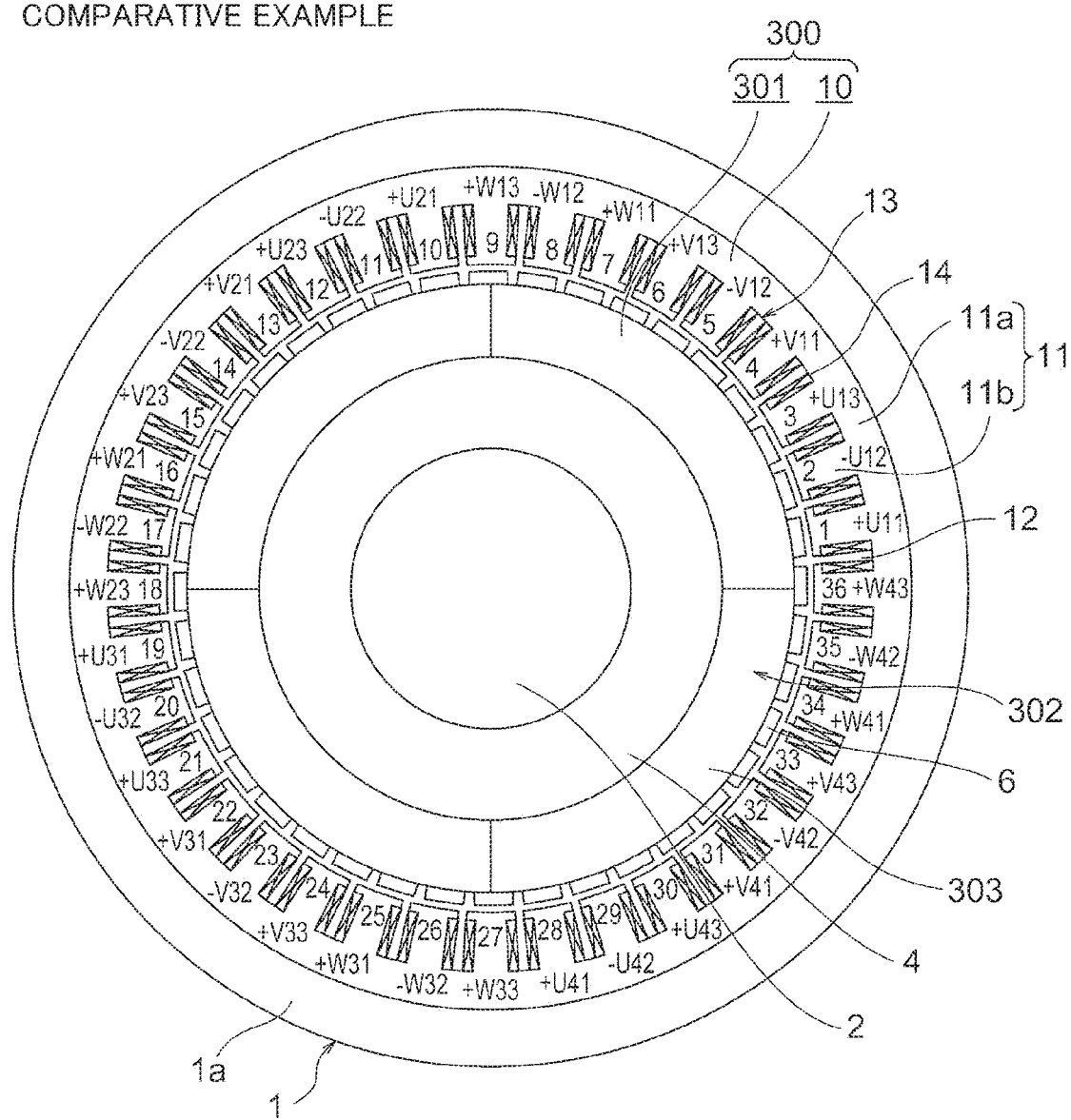
FIG. 4 is a sectional view for illustrating a rotating electric machine of a comparative example.

FIG. 1 is a sectional view for illustrating a hoisting machine of an elevator to which a rotating electric machine according to a first embodiment of the present invention is applied. FIG. 2 is a sectional view taken along the line II-II of FIG. 1 as viewed from the direction indicated by the arrows. FIG. 3 is a wire connection diagram of stator coils in the rotating electric machine according to the first embodiment of the present invention. FIG. 4 is a sectional view for illustrating a rotating electric machine of a comparative example. In FIG. 2 and FIG. 4, hatching is omitted for convenience. Further, in FIG. 2 and FIG. 4, the numbers 1 to 36 are tooth numbers given to teeth in the counterclockwise arrangement order.

In FIG. 1, a hoisting machine 100 includes a stator frame 1, a stator 10, a shaft 2, a rotor frame 4, a rotor core 5, magnetic poles 6, and a sheave 7. The stator 10 is firmly fixed to the stator frame 1, and includes an annular stator core 11 and stator coils 13 mounted to the stator core 11. The shaft 2 is firmly fixed to the stator frame 1 and arranged at an axial center position of the stator 10. The rotor frame 4 is arranged on the shaft 2 so as to be rotatable through intermediation of a bearing 3. The rotor core 5 is firmly fixed to the rotor frame 4, and is arranged coaxially with the stator 10 on an inner peripheral side of the stator 10 through a magnetic gap G. The magnetic poles 6 are provided on an outer peripheral portion of the rotor core 5. The sheave 7 is firmly fixed to an outer peripheral portion of the shaft 2 of the rotor frame 4. The shaft 2 is fastened and fixed to the stator frame 1 by bolts 8. The rotor core 5 is fastened and fixed to the rotor frame 4 by bolts 9.

Although not shown, the hoisting machine 100 having such a configuration is arranged in a hoistway (not shown), and a rope is wound around the sheave 7. Further, a car and a counterweight are coupled to the rope, and are arranged in the hoistway so that the car and the counterweight can be raised and lowered. An alternating current is supplied to the stator coils 13 so that rotating magnetic fields are generated by the stator coils 13. With the rotating magnetic fields, a rotor 20 is driven to rotate so that the car and the counterweight are raised and lowered in the hoistway.

Next, a configuration of a rotating electric machine 200 is described with reference to FIG. 2. The rotating electric machine 200 includes the stator 10 and the rotor 20. The rotor 20 is coaxially arranged on an inner peripheral side of the stator 10 through the slight magnetic gap G.

The rotor 20 includes the shaft 2, the rotor frame 4, the annular rotor core 5, and the magnetic poles 6. The rotor frame is mounted to the shaft 2 so as to be rotatable through intermediation of the bearing 3. The rotor core 5 is firmly fixed to the rotor frame 4. The magnetic poles 6 are provided on the outer peripheral portion of the rotor core 5. The rotor core 5 is formed of five arc-shaped segment cores 21 annularly arranged in a circumferential direction. The segment cores 21 are each formed of a predetermined number of laminated magnetic pieces each punched out in an arc shape from a magnetic thin plate made of a soft magnetic material such as an electromagnetic steel sheet. Forty magnetic poles 6 are arranged on the outer peripheral portion of the rotor core 5 at an equiangular pitch in the circumferential direction. That is, the number of poles of the rotor 20 is 40.

The stator core 11 is formed of a predetermined number of laminated magnetic pieces punched out in an arc shape from a magnetic thin plate made of a soft magnetic material such as an electromagnetic steel sheet, and includes an annular core back 11a and thirty-six teeth 11b. The teeth 11b project radially inward from an inner peripheral surface of the core back 11a and are arranged at an equiangular pitch in the circumferential direction. Slots 12 are each formed between teeth 11b adjacent to each other in the circumferential direction. The stator coils 13 include thirty-six concentrated winding coils 14, which are each manufactured by winding a conductor wire a predetermined number of turns around a corresponding one of the teeth 11b. The stator 10 having such a configuration is held on the stator frame 1 by inserting and fixing the stator core 11 to a cylindrical portion 1a of the stator frame 1, for example, through press-fitting or shrink fitting.

Next, description is made of a configuration of the stator coils 13.

Thirty-six concentrated winding coils 14 are connected to a U-phase power supply, a V-phase power supply, and a W-phase power supply. Specifically, twelve concentrated winding coils 14 of +U11, −U12, +U13, +U21, −U22, +U23, +U31, −U32, +U33, +U41, −U42, and +U43 are connected to the U-phase power supply. Twelve concentrated winding coils 14 of +V11, −V12, +V13, +V21, −V22, +V23, +V31, −V32, +V33, +V41, −V42, and +V43 are connected to the V-phase power supply. Twelve concentrated winding coils 14 of +W11, −W12, +W13, +W21, −W22, +W23, +W31, −W32, +W33, +W41, −W42, and +W43 are connected to the U-phase power supply.

The thirty-six concentrated winding coils are arranged in the circumferential direction in the order of +U11, −U12, +U13, +V11, −V12, +V13, +W11, −W12, +W13, +U21, −U22, +U23, +V21, −V22, +V23, +W21, −W22, +W23, +U31, −U32, +U33, +V31, −V32, +V33, +W31, −W32, +W33, +U41, −U42, +U43, +V41, −V42, +V43, +W41, −W42, and +W43. The signs "+" and "−" indicate winding polarities of the concentrated winding coils. The signs "+" and "−" indicate opposite winding polarities.

As illustrated in FIG. 3, the stator coils 13 include a first stator coil 15, a second stator coil 16, a third stator coil 17, and a fourth stator coil 18.

The first stator coil 15 is formed of a U1-phase coil, a V1-phase coil, and a W1-phase coil, which are connected in a Y connection, and includes power supply terminals A1, B1, and C1. The U1-phase coil is formed of the concentrated winding coils 14 of +U11, −U12, and +U13 connected in series. The V1-phase coil is formed of the concentrated winding coils 14 of +V11, −V12, and +V13 connected in series. The W1-phase coil is formed of the concentrated winding coils 14 of +W11, −W12, and +W13 connected in series.

The second stator coil 16 is formed of a U2-phase coil, a V2-phase coil, and a W2-phase coil, which are connected in a Y connection, and includes power supply terminals A2, B2, and C2. The U2-phase coil is formed of the concentrated winding coils 14 of +U21, −U22, and +U23 connected in series. The V1-phase coil is formed of the concentrated winding coils 14 of +V21, −V22, and +V23 connected in series. The W2-phase coil is formed of the concentrated winding coils 14 of +W21, −W22, and +W23 connected in series.

The third stator coil 17 is formed of a U3-phase coil, a V3-phase coil, and a W3-phase coil, which are connected in a Y connection, and includes power supply terminals A3, B3, and C3. The U3-phase coil is formed of the concentrated winding coils 14 of +U31, −U32, and +U33 connected in series. The V3-phase coil is formed of the concentrated winding coils 14 of +V31, −V32, and +V33 connected in series. The W3-phase coil is formed of the concentrated winding coils 14 of +W31, −W32, and +W33 connected in series.

The fourth stator coil 18 is formed of a U4-phase coil, a V4-phase coil, and a W4-phase coil, which are connected in a Y connection, and includes power supply terminals A4, B4, and C4. The U4-phase coil is formed of the concentrated winding coils 14 of +U41, −U42, and +U43 connected in series. The V4-phase coil is formed of the concentrated winding coils 14 of +V41, −V42, and +V43 connected in series. The W4-phase coil is formed of the concentrated winding coils 14 of +W41, −W42, and +W43 connected in series.

The power supply terminals A1, A2, A3, and A4 are connected. The power supply terminals B1, B2, B3, and B4 are connected. The power supply terminals C1, C2, C3, and C4 are connected. In such a manner, the stator coils 13 including the first to fourth stator coils 16 to 18 connected in parallel are formed. In the stator coils 13 having such a configuration, a circuit in which the parallel number of each phase is 4 is obtained.

The rotating electric machine 200 having such a configuration is a 40-pole 36-slot rotating electric machine. The greatest common divisor of the number of poles and the number of slots is 4, which matches with the parallel number of each phase in the stator coils 13.

The parallel number of each phase in the stator coils 13 matches with the greatest common divisor of the number of poles and the number of slots, but it is only required that the parallel number of each phase be a divisor of the greatest common divisor of the number of poles and the number of slots.

In the first embodiment, the rotor core 5 is manufactured by arranging the segment cores 21, which are each formed of a predetermined number of electromagnetic steel sheets punched out in an arc shape and laminated on one another, in the circumferential direction. Therefore, according to the first embodiment, as compared to a case in which the rotor core is manufactured by laminating electromagnetic steel sheets punched out in an annular shape, a material yield of the rotor core 5 can be improved.

In the first embodiment, the number of segments of the rotor core 5 is 5, which is not a divisor and a multiple of the greatest common divisor of the number of poles and the number of slots in the rotating electric machine 200. In the following, description is made of an effect of the configuration in which the number of segments of the rotor core 5 is not a divisor and a multiple of the greatest common divisor of the number of poles and the number of slots while comparing with a comparative example illustrated in FIG. 4. FIG. 4 is a sectional view for illustrating a rotating electric machine of the comparative example.

As illustrated in FIG. 4, in a rotating electric machine 300 of the comparative example, a rotor core 302 is formed of four arc-shaped segment cores 303 annularly arranged in a circumferential direction. The rotating electric machine 300 has the same configuration as the rotating electric machine 200 except that a rotor 301 including the rotor core 302 is used. That is, the rotating electric machine 300 has the same configuration as the rotating electric machine 200 except that the number of segments of the rotor core 302 is 4.

The rotor 20, 301 rotates, in synchronization with rotating magnetic fields generated by the first to fourth stator coils 15 to 18, at the same speed as the rotation speed of the rotating magnetic fields. The thirty-six concentrated winding coils are arranged in the circumferential direction in the order of +U11, −U12, +U13, +V11, −V12, +V13, +W11, −W12, +W13, +U21, −U22, +U23, +V21, −V22, +V23, +W21, −W22, +W23, +U31, −U32, +U33, +V31, −V32, +V33, +W31, −W32, +W33, +U41, −U42, +U43, +V41, −V42, +V43, +W41, −W42, and +W43. As described above, a group of nine concentrated winding coils 14 forming the first stator coil 15, a group of nine concentrated winding coils 14 forming the second stator coil 16, a group of nine concentrated winding coils 14 forming the third stator coil 17, and a group of nine concentrated winding coils 14 forming the fourth stator coil 18 are arranged in the stated order in the circumferential direction on the stator core 11. Therefore, the rotating magnetic fields are distributed in such a manner that four peaks are formed at equal intervals in the circumferential direction. That is, when a rotating magnetic field generated by one stator coil is defined as one unit, four units of rotating magnetic fields, which correspond to the parallel number of each phase, are arranged at equal intervals in the circumferential direction.

In the rotating electric machine 300 of the comparative example, the number of segments of the rotor core 302 is 4, which matches with the number of units of the rotating magnetic fields. In this case, a phase of a harmonic component of a magnetomotive force generated by the configuration including the rotor core 302 formed of the four segment cores 303 matches in unit of the rotating magnetic fields. Thus, a torque ripple generated by the rotating magnetic fields is superimposed on the torque ripple generated by the harmonic component of the magnetomotive force, with the result that the torque ripple is increased.

Even when the number of segments of the rotor core is a divisor or a multiple of the greatest common divisor of the number of poles and the number of slots, the phase of the harmonic component of the magnetomotive force generated by the division of the rotor core matches in unit of the divisor of the rotating magnetic fields, which causes increase in torque ripple.

With a hoisting machine including such rotating electric machine 300, the torque ripple having been increased is transmitted through a rope and gives discomfort to a passenger, with the result that ride comfort of an elevator is degraded.

In the rotating electric machine 200 according to the first embodiment, the number of segments of the rotor core 5 is 5, which is not a divisor (1, 2, 4) and a multiple (4, 8, 12, . . . ) of the greatest common divisor (4) of the number of poles (40) and the number of slots (36) in the rotating electric machine 200. Therefore, the phase of the harmonic component of the magnetomotive force generated by the configuration including the rotor core 5 formed of the five segment cores 21 differs in unit of the rotating magnetic fields. Therefore, the torque ripple generated by the rotating magnetic fields is not superimposed on the torque ripple generated by the harmonic component of the magnetomotive force, thereby suppressing the increase in torque ripple.

Therefore, in the hoisting machine including the rotating electric machine 200, the increase in torque ripple is suppressed, thereby being capable of avoiding a situation such as degradation in ride comfort of the elevator.

Second Embodiment

Figure 5:
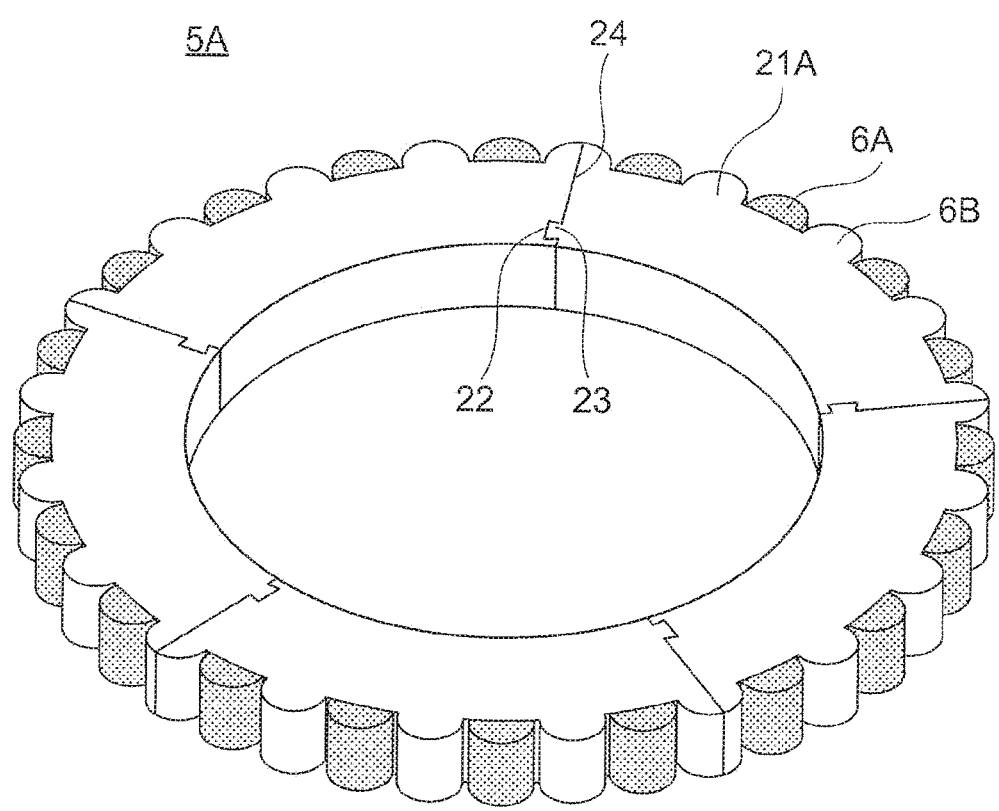
FIG. 5 is a perspective view for illustrating a rotor core of a rotating electric machine according to a second embodiment of the present invention.
Figure 6:
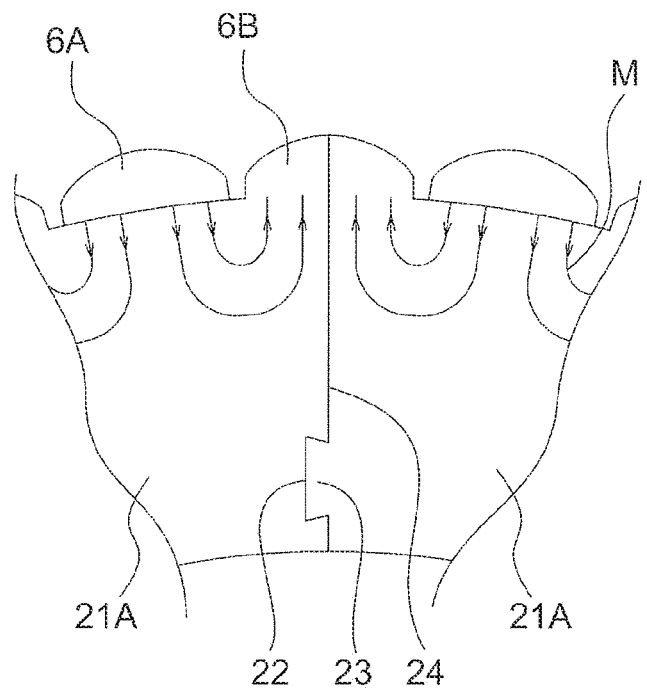
FIG. 6 is a schematic view for illustrating magnetic paths generated by permanent magnets in the rotor core of the rotating electric machine according to the second embodiment of the present invention.

FIG. 5 is a perspective view for illustrating a rotor core of a rotating electric machine according to a second embodiment of the present invention. FIG. 6 is a schematic view for illustrating magnetic paths generated by permanent magnets in the rotor core of the rotating electric machine according to the second embodiment of the present invention.

In FIG. 5, a rotor core 5A is a ring-shaped laminated core having a predetermined thickness. On an outer peripheral portion of the rotor core 5A, forty magnetic poles including magnetic poles 6A each formed of a permanent magnet and magnetic poles 6B each formed of a soft magnetic body are arranged alternately in the circumferential direction at an equiangular pitch. The rotor core 5A is formed of five segment cores 21A arranged in the circumferential direction. The segment cores 21A are obtained by equally dividing the rotor core 5A in the circumferential direction into five segments at division positions each corresponding to a center position of the magnetic pole 6B in the circumferential direction. The number of magnetic poles of the segment cores 21A is 8.

The segment cores 21A are each formed of a predetermined number of arc-shaped magnetic pieces punched out from a magnetic thin plate made of a soft magnetic material such as an electromagnetic steel sheet and laminated on one another. On this occasion, magnetic pole portions are formed integrally with the magnetic pieces having been punched out, and the magnetic pole portions are laminated on one another to form the magnetic poles 6B. Further, a dovetail groove portion is formed in a surface of each magnetic piece on one side in the circumferential direction, and the dovetail groove portions are laminated on one another to form a dovetail groove 22. Further, a dovetail pin portion is formed on a surface of each magnetic piece on another side in the circumferential direction, and the dovetail pin portions are laminated on one another to form a dovetail pin 23. The magnetic poles 6A are formed by firmly fixing permanent magnets on outer peripheral surfaces of the segment cores 21A.

The five segment cores 21A annularly arranged in the circumferential direction are integrally coupled to one another through fitting of the dovetail pin 23 and the dovetail groove 22 while holding opposed side surfaces of adjacent segment cores 21A in the circumferential direction in abutment against each other. A division surface 24 being an abutment surface of the opposed side surfaces of adjacent segment cores 21A in the circumferential direction is formed on a flat plane including an axis center of the rotor core 5A in a region other than a fitting portion between the dovetail groove 22 and the dovetail pin 23. The division surface 24 is located at a center position in the circumferential direction between adjacent magnetic poles 6A having the same polarity. The permanent magnets forming the magnetic poles 6A are each magnetized so as to have an N pole on a radially inner side and an S pole on a radially outer side.

The rotor core 5A having such a configuration has a so-called consequent pole structure in which the magnetic poles 6A each formed of a permanent magnet are arranged in the circumferential direction so as to have the same magnetizing direction in the radial direction.

The second embodiment 2 has the same configuration as the first embodiment described above except that the rotor core 5A is used.

Also in the second embodiment, the rotor core 5A is divided into the five segment cores 21A, and the segment cores 21A are each manufactured by laminating magnetic pieces punched out in an arc shape. Moreover, the number of segments of the rotor core 5A is 5, the number of poles in the rotating electric machine is 40, and the number of slots in the rotating electric machine is 36. Thus, the number of segments of the rotor core 5A is not a divisor and a multiple of the greatest common divisor of the number of poles and the number of slots in the rotating electric machine.

Therefore, also in the second embodiment, the same effect as the first embodiment described above can be attained.

In the second embodiment, the segment cores 21A are obtained by equally dividing the rotor core 5A in the circumferential direction into five segments. Thus, the five segment cores 21A have the same shape. Therefore, only one die for punching out the arc-shaped magnetic pieces from a magnetic thin plate made of a soft magnetic material is required, thereby being capable of reducing manufacturing cost.

As indicated by the arrows in FIG. 6, the magnetic poles 6A each formed of a permanent magnet generate magnetic paths M, which pass through portions of the rotor core 5A on a radially inner side with respect to the magnetic poles 6A to reach the magnetic pole 6B side and enter the magnetic pole 6B from the radially inner side. In the rotor core 5A, the division surface 24 is formed on the flat plane, which passes through the center position of the magnetic pole 6B in the circumferential direction between the adjacent magnetic poles 6A having the same polarity and includes the axis center of the rotor core 5A. With this configuration, as illustrated in FIG. 6, the influence of hindrance of the magnetic paths M by the division surface 24 is reduced, and a use ratio of magnetic fluxes generated by the magnetic poles 6A is enhanced, thereby being capable of increasing the torque.

The side surfaces of the segment cores 21A are held in abutment against each other. Therefore, reduction in magnetic flux amount caused by passage of the magnetic fluxes through the division surface 24 is suppressed, and hence the use ratio of the magnetic fluxes generated by the magnetic poles 6A is enhanced.

The segment cores 21A are coupled to each other through fitting of the dovetail groove 22 and the dovetail pin 23. The adjacent segment cores 21A can be rigidly coupled to each other under the state in which the side surfaces are held in abutment against each other, thereby being capable of enhancing the circularity of the rotor core 5A. When the circularity of the rotor core 5A is degraded, cogging torque is generated, which may cause degradation in ride comfort of the elevator. Therefore, the improvement in circularity of the rotor core 5A is of great significance.

The dovetail groove 22 and the dovetail pin 23 may cause hindrance of the magnetic paths M. Therefore, it is desired that the dovetail groove 22 and the dovetail pin 23 be arranged on a radially inner side of a cylindrical surface having a diameter that corresponds to an average value of an outer diameter and an inner diameter of the rotor core 5A and having a center at the axis center of the rotor core 5A. With this configuration, the use ratio of the magnetic fluxes generated by the magnetic poles 6A can be enhanced.

The rotor core 5A including the magnetic poles 6A and 6B has the consequent pole structure. Therefore, as compared to a case in which the magnetic poles 6 are each formed of a permanent magnet, the use amount of the magnets can be reduced, thereby being capable of reducing the manufacturing cost for the rotating electric machine.

In the consequent pole structure, at the division surface 24, magnetic fluxes generated by the permanent magnets having the same polarity are opposed to each other, with the result that a repelling force is generated. The repelling force displaces the adjacent segment cores 21A in the radial direction, or acts to rotate the adjacent segment cores 21A in the circumferential direction, which may cause degradation in circularity of the rotor core 5A. In the second embodiment, the segment cores 21A are rigidly coupled to each other through fitting of the dovetail groove 22 and the dovetail pin 23. Therefore, occurrence of the displacement of the segment cores 21A by the repelling force is suppressed, thereby suppressing the degradation in circularity of the rotor core 5A.

Third Embodiment

Figure 7:
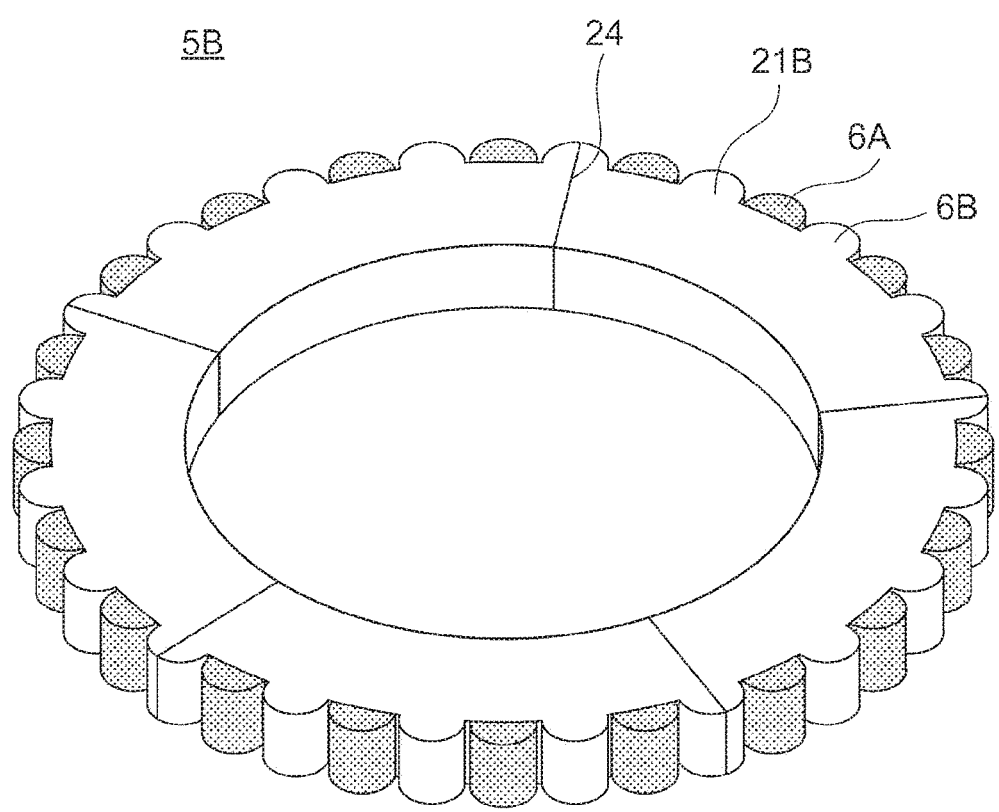
FIG. 7 is a perspective view for illustrating a rotor core of a rotating electric machine according to a third embodiment of the present invention.

FIG. 7 is a perspective view for illustrating a rotor core of a rotating electric machine according to a third embodiment of the present invention.

In FIG. 7, the dovetail groove and the dovetail pin are omitted from both side surfaces of a segment core 21B in the circumferential direction. A rotor core 5B is formed of five segment cores 21B annularly arranged in the circumferential direction. The five annularly arranged segment cores 21B are integrally coupled to one another by holding side surfaces thereof in the circumferential direction, with an adhesive applied thereon, in abutment against one another and curing the adhesive.

The third embodiment has the same configuration as the second embodiment except that the adjacent segment cores 21B are coupled to one another through use of the adhesive.

Therefore, also in the third embodiment, the same effect as the second embodiment can be attained.

Fourth Embodiment

Figure 8:
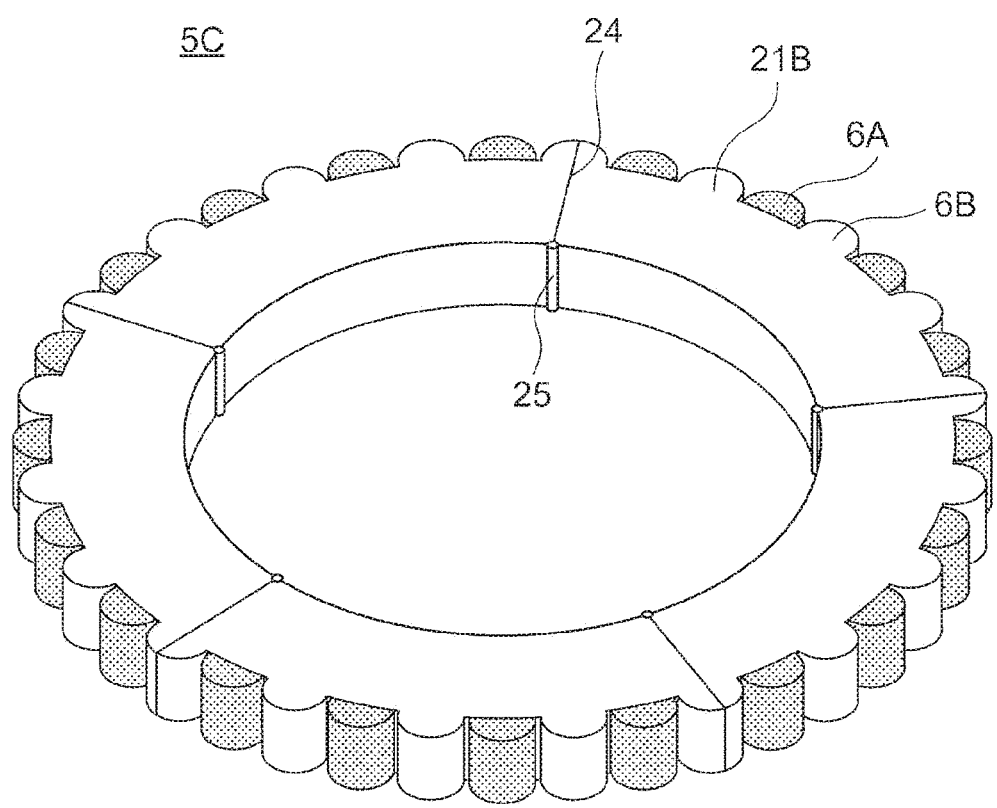
FIG. 8 is a perspective view for illustrating a rotor core of a rotating electric machine according to a fourth embodiment of the present invention.

FIG. 8 is a perspective view for illustrating a rotor core of a rotating electric machine according to a fourth embodiment of the present invention.

In FIG. 8, a rotor core 5C is formed of the five segment cores 21B annularly arranged in the circumferential direction. The five annularly arranged segment cores 21B are integrally coupled to one another by holding the side surfaces thereof in the circumferential direction in abutment against one another and welding inner peripheral portions of abutment portions along the entire length in the axial direction.

The fourth embodiment has the same configuration as the second embodiment except that the adjacent segment cores 21B are coupled to one another through use of a welding portion 25.

Therefore, also in the fourth embodiment, the same effect as the second embodiment can be attained.

Fifth Embodiment

Figure 9:
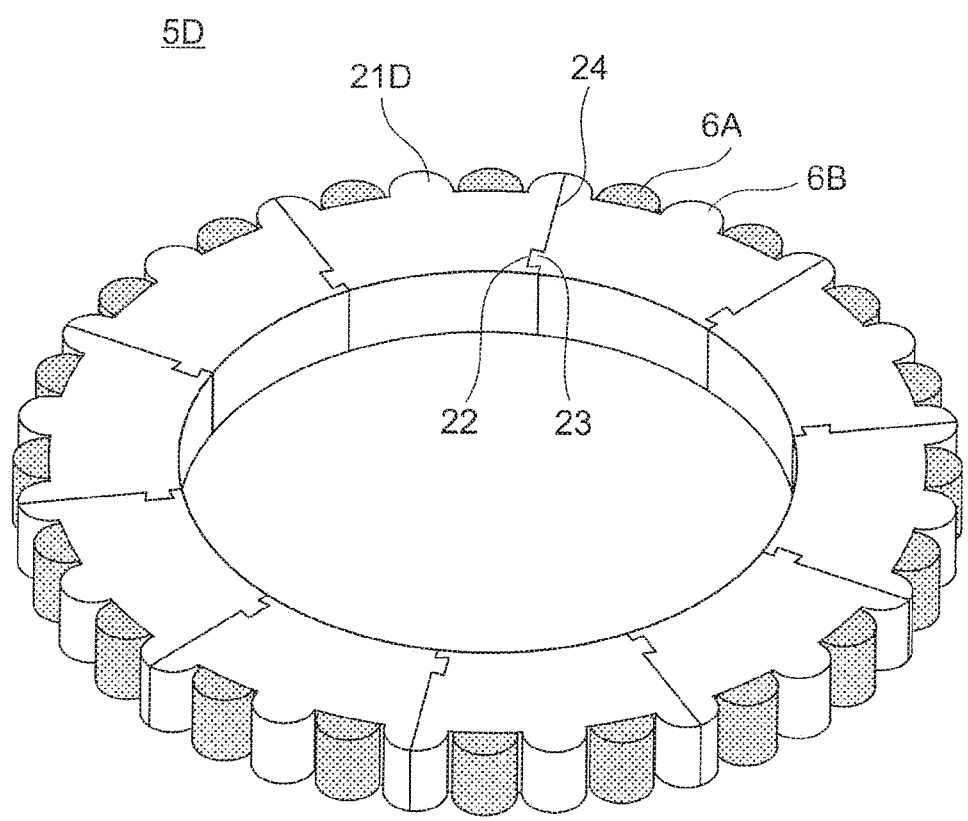
FIG. 9 is a perspective view for illustrating a rotor core of a rotating electric machine according to a fifth embodiment of the present invention.

FIG. 9 is a perspective view for illustrating a rotor core of a rotating electric machine according to a fifth embodiment of the present invention.

In FIG. 9, the dovetail groove 22 and the dovetail pin 23 are formed from both side surfaces of a segment core 21D in the circumferential direction. A rotor core 5D is formed of ten segment cores 21D annularly arranged in the circumferential direction. The ten annularly arranged segment cores 21D are integrally coupled to one another through fitting of the dovetail pin 23 and the dovetail groove 22 while holding opposed side surfaces of adjacent segment cores 21D in the circumferential direction in abutment against each other.

On an outer peripheral portion of the rotor core 5D, the magnetic poles 6A and the magnetic poles 6B, that is, forty magnetic poles 6 in total are alternately arranged in the circumferential direction at an equiangular pitch. The segment cores 21D are obtained by equally dividing the rotor core 5D in the circumferential direction into ten segments at positions each corresponding to a center position of the magnetic pole 6B in the circumferential direction. The number of magnetic poles of the segment core 21D is 4.

The fifth embodiment has the same configuration as the second embodiment described above except that the number of segments of the rotor core 5D is 10.

Also in the fifth embodiment, the rotor core 5D is divided into the ten segment cores 21D, and the segment cores 21D are each manufactured by laminating magnetic pieces punched out in an arc shape. Moreover, the number of segments of the rotor core 5D is 10, the number of poles in the rotating electric machine is 40, and the number of slots in the rotating electric machine is 36. Thus, the number of segments of the rotor core 5D is not a divisor and a multiple of the greatest common divisor of the number of poles and the number of slots in the rotating electric machine.

Therefore, also in the fifth embodiment, the same effect as the second embodiment described above can be attained.

In the fifth embodiment, the number of segments of the rotor core 5D is 10. Thus, the number of magnetic pieces punched out from one magnetic thin plate is increased, thereby being capable of improving a material yield.

Sixth Embodiment

Figure 10:
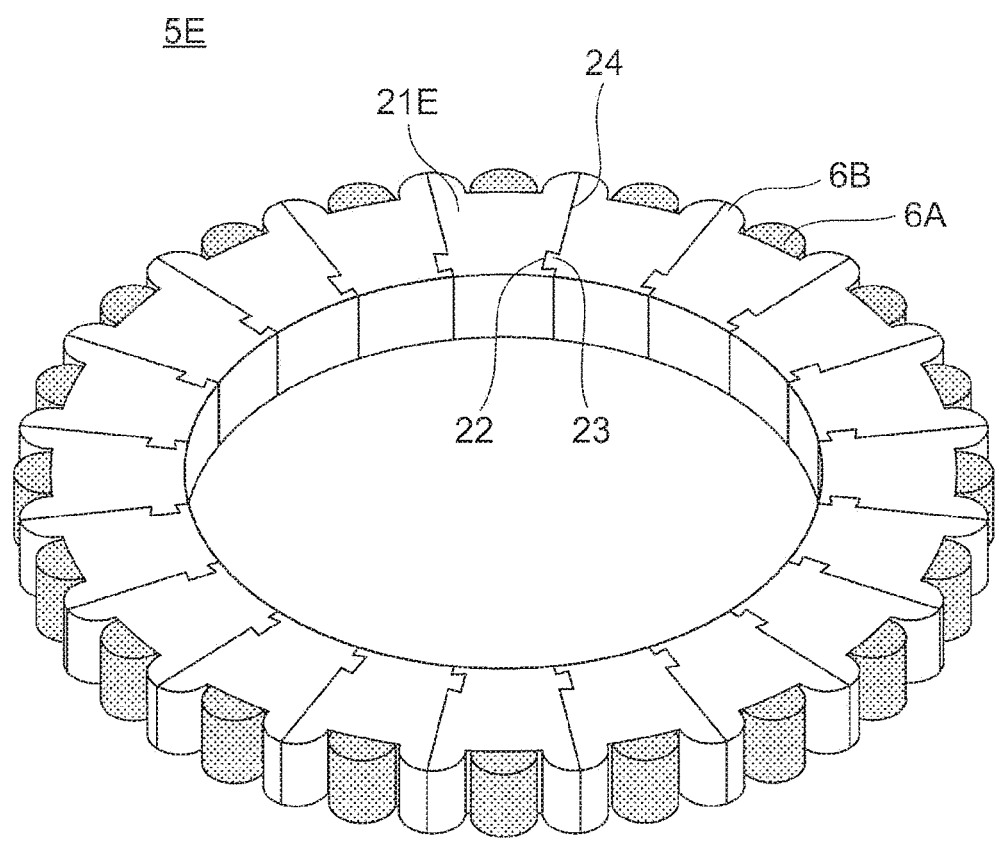
FIG. 10 is a perspective view for illustrating a rotor core of a rotating electric machine according to a sixth embodiment of the present invention.
Figure 11:
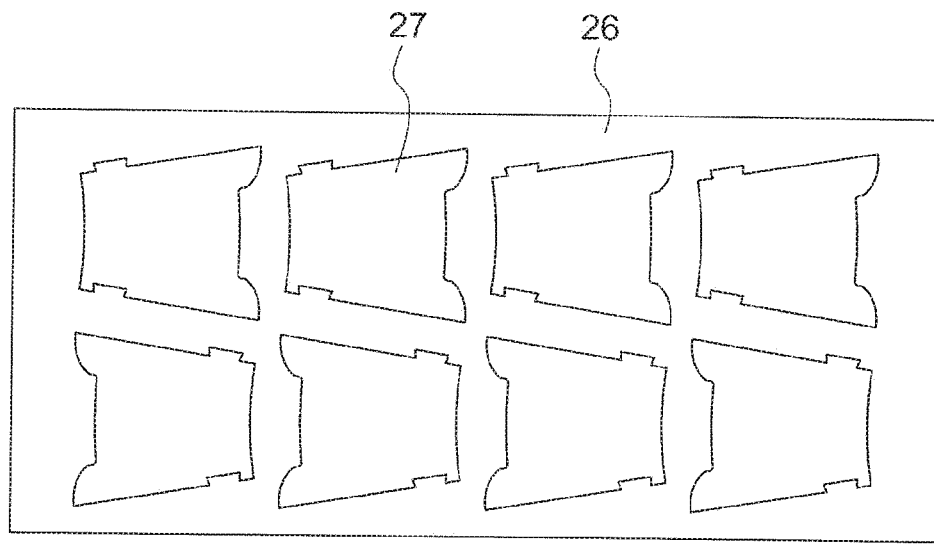
FIG. 11 is a view for illustrating a manufacturing step for the rotor core of the rotating electric machine according to the sixth embodiment of the present invention.

FIG. 10 is a perspective view for illustrating a rotor core of a rotating electric machine according to a sixth embodiment of the present invention. FIG. 11 is a view for illustrating a manufacturing step for the rotor core of the rotating electric machine according to the sixth embodiment of the present invention.

In FIG. 10, the dovetail groove 22 and the dovetail pin 23 are formed from both side surfaces of a segment core 21E in the circumferential direction. A rotor core 5E is formed of twenty segment cores 21E annularly arranged in the circumferential direction. The twenty annularly arranged segment cores 21E are integrally coupled to one another through fitting of the dovetail pin 23 and the dovetail groove 22 while holding opposed side surfaces of adjacent segment cores 21E in the circumferential direction in abutment against each other.

On an outer peripheral portion of the rotor core 5E, the magnetic poles 6A and the magnetic poles 6B, that is, forty magnetic poles 6 in total are alternately arranged in the circumferential direction at an equiangular pitch. The segment cores 21E are obtained by equally dividing the rotor core 5E in the circumferential direction into twenty segments at positions each corresponding to a center position of the magnetic pole 6B in the circumferential direction. The number of magnetic poles of the segment core 21E is 2.

Although not shown, the number of slots of the stator is 48. The sixth embodiment has the same configuration as the second embodiment described above except that a 40-pole 48-slot rotating electric machine is given and that the number of segments of the rotor core 5E is 20.

Also in the sixth embodiment, the rotor core 5E is divided into the twenty segment cores 21E, and the segment cores 21E are each manufactured by laminating magnetic pieces punched out in an arc shape. Moreover, the number of segments of the rotor core 5E is 20, the number of poles in the rotating electric machine is 40, and the number of slots in the rotating electric machine is 48. The number of poles in the rotating electric machine is 40, the number of slots in the rotating electric machine is 48, and the greatest common divisor of the number of poles and the number of slots is 8. Thus, the number of segments of the rotor core 5E is not a divisor and a multiple of the greatest common divisor of the number of poles and the number of slots in the rotating electric machine.

Therefore, also in the sixth embodiment, the same effect as the second embodiment described above can be attained.

In the sixth embodiment, the number of segments of the rotor core 5E is 20, the number of magnetic poles of the segment core 21E is 2. Thus, a dimension of the segment core 21E is minimum. Therefore, as illustrated in FIG. 11, the number of magnetic pieces 27 punched out from one magnetic thin plate 26 is further increased, thereby being capable of further improving a material yield.

Seventh Embodiment

Figure 12:
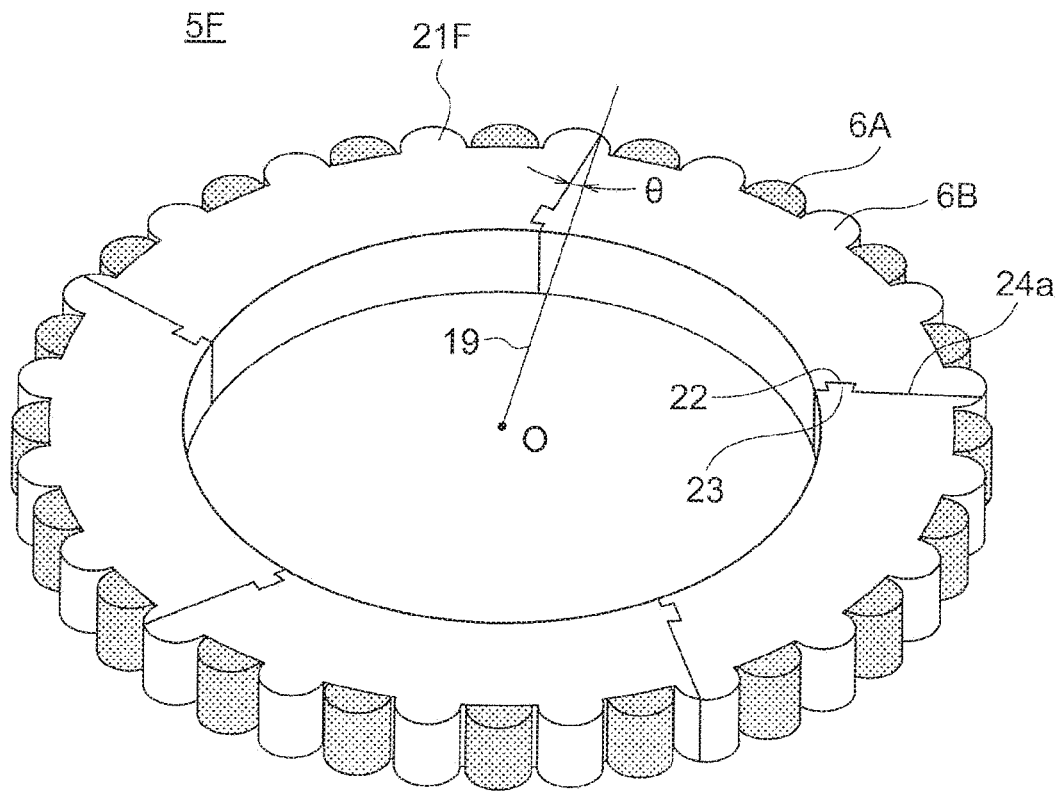
FIG. 12 is a perspective view for illustrating a rotor core of a rotating electric machine according to a seventh embodiment of the present invention.

FIG. 12 is a perspective view for illustrating a rotor core of a rotating electric machine according to a seventh embodiment of the present invention.

In FIG. 12, the dovetail groove 22 and the dovetail pin 23 are formed from both side surfaces of a segment core 21F in the circumferential direction. A rotor core 5B is formed of five segment cores 21F annularly arranged in the circumferential direction. The ten annularly arranged segment cores 21F are integrally coupled to one another through fitting of the dovetail pin 23 and the dovetail groove 22 while holding opposed side surfaces of adjacent segment cores 21F in the circumferential direction in abutment against each other.

On an outer peripheral portion of the rotor core 5F, the magnetic poles 6A and the magnetic poles 6B, that is, forty magnetic poles 6 in total are alternately arranged in the circumferential direction at an equiangular pitch. The segment cores 21F are obtained by equally dividing the rotor core 5F in the circumferential direction into five segments at positions of the magnetic poles 6B each located between adjacent magnetic poles 6A. The number of magnetic poles of the segment core 21F is 8. The division surface 24$a$ is formed on a flat plane which is inclined by an angle $\theta$ toward one side in the circumferential direction with respect to a flat plane 19 including an axis center O of the rotor core 5F. The division surface 24$a$ divides the magnetic pole 6B, which is located between adjacent magnetic poles 6A having the same polarity, in the circumferential direction.

The seventh embodiment has the same configuration as the second embodiment except that the division surface 24$a$ of the rotor core 5F is formed on the flat plane inclined by the angle $\theta$ toward the one side in the circumferential direction with respect to the flat plane 19 including the axis center O of the rotor core 5F.

Also in the seventh embodiment, the rotor core 5F is divided into five segment cores 21F, and the segment cores 21F are each manufactured by laminating magnetic pieces punched out into an arc shape. The five segment cores 21F are integrally coupled to one another through fitting of the dovetail grooves 22 and the dovetail pins 23. Thus, the number of segments of the rotor core 5A is not a divisor and a multiple of the greatest common divisor of the number of poles and the number of slots in the rotating electric machine.

Therefore, also in the seventh embodiment, the same effect as the second embodiment described above can be attained.

In the second to seventh embodiments described above, the magnetic poles each formed of a soft magnetic body are formed integrally with the segment core. However, magnetic poles each formed of a soft magnetic body, which are components manufactured separately from the segment core, may be firmly fixed to the segment core through, for example, welding, fitting, or bonding.

Eighth Embodiment

Figure 13:
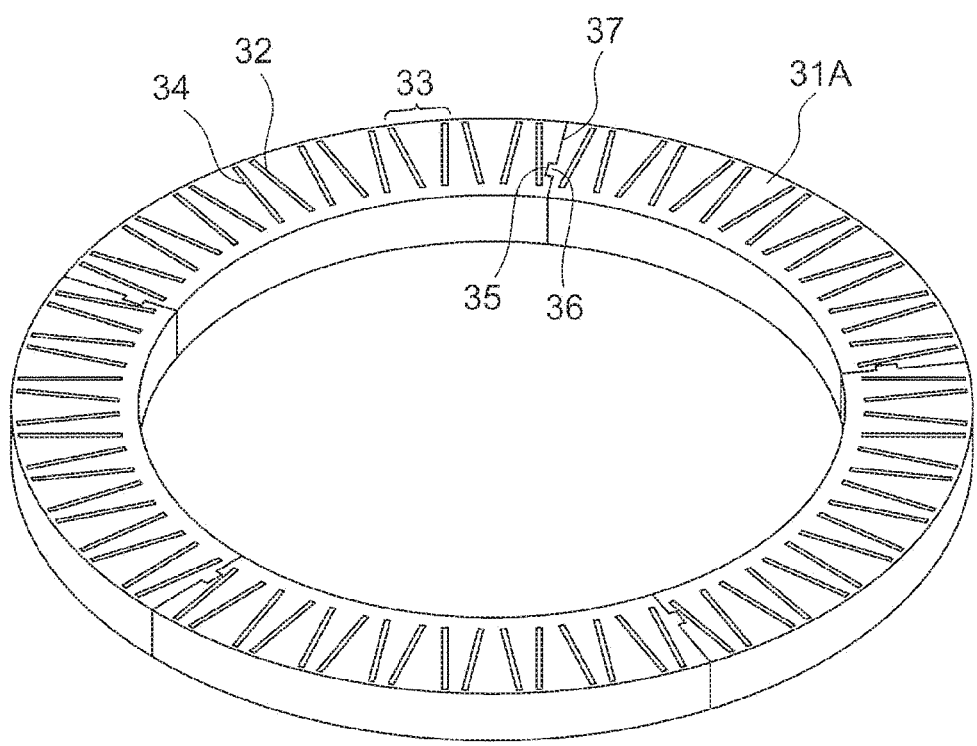
FIG. 13 is a perspective view for illustrating a rotor core of a rotating electric machine according to an eighth embodiment of the present invention.
Figure 14:
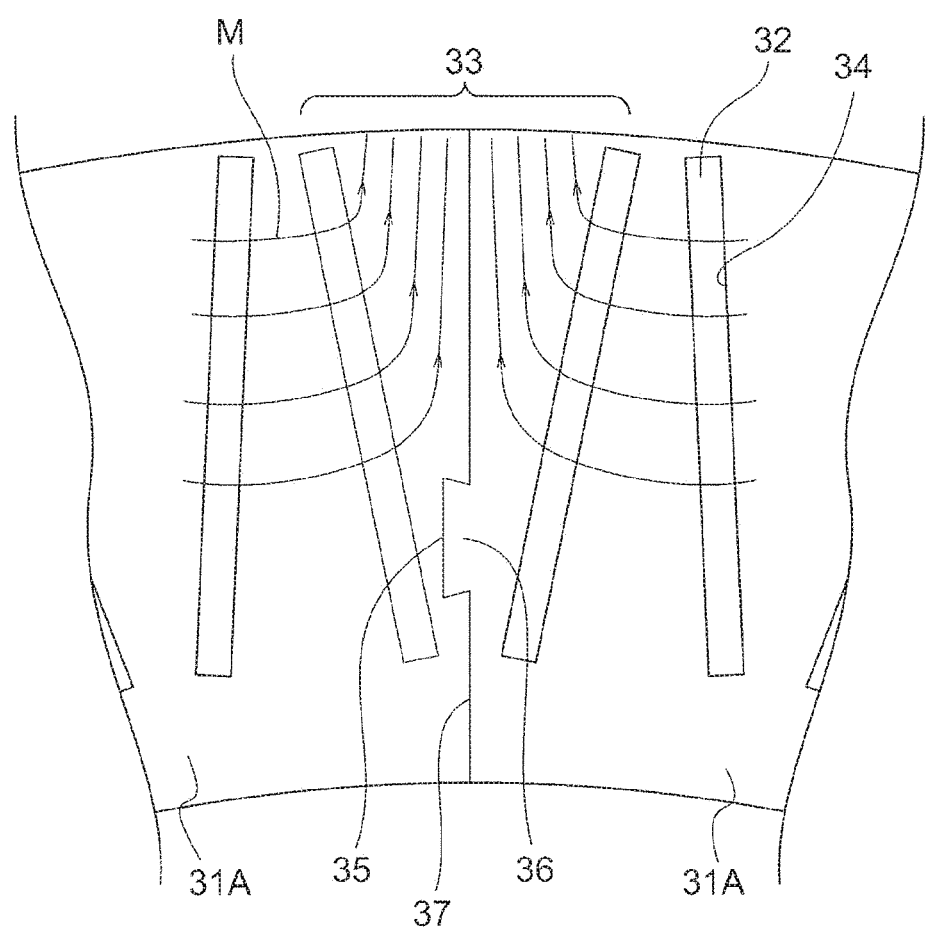
FIG. 14 is a schematic view for illustrating magnetic paths generated by permanent magnets in the rotor core of the rotating electric machine according to the eighth embodiment of the present invention.

FIG. 13 is a perspective view for illustrating a rotor core of a rotating electric machine according to an eighth embodiment of the present invention. FIG. 14 is a schematic view for illustrating magnetic paths generated by permanent magnets in the rotor core of the rotating electric machine according to the eighth embodiment of the present invention.

In FIG. 13, a rotor core 5H is a ring-shaped laminated core having a predetermined thickness. The rotor core 5H has a so-called interior permanent magnet (IPM) structure having eighty permanent magnets 32 embedded therein. The eighty permanent magnets 32 are arranged in the circumferential direction so that each of the permanent magnets 32 is opposed to one adjacent permanent magnet 32 with the same polarity and is opposed to another adjacent permanent magnet 32 with a different polarity. A group of permanent magnets 32 opposed to each other with the same polarity form a magnetic pole 33. That is, the number of poles of the rotor is 40.

The permanent magnets 32 are each formed into a rectangular parallelepiped having a length equal to a thickness of the rotor core 5H and having a rectangular section, and a length direction of a short side of the rectangular section is set as a magnetizing direction. Two permanent magnets 32 forming each magnetic pole are arranged with length directions thereof being matched with the thickness direction of the rotor core 5H and are in plane symmetry with respect to a plane including the axis center of the rotor core 5H. Further, opposed surfaces of the two permanent magnets 32 forming each magnetic pole are gradually separated apart as proceeding radially outward.

The rotor core 5H is formed of five segment cores 31A annularly arranged in the circumferential direction. The segment cores 31A are obtained by equally dividing the rotor core 5H in the circumferential direction at division positions each corresponding to a center position in the circumferential direction between adjacent permanent magnets 32 having the same polarity. The number of magnetic poles of the segment core 31A is 8.

The segment cores 31A are each formed of a predetermined number of arc-shaped magnetic pieces punched out from a magnetic thin plate made of a soft magnetic material such as an electromagnetic steel sheet and laminated on one another. On this occasion, through holes are formed integrally with the magnetic pieces having been punched out, and through holes are laminated on one another to form a magnet receiving holes 34. Further, a dovetail groove portion is formed in a surface of each magnetic piece on one side in the circumferential direction, and the dovetail groove portions are laminated on one another to form a dovetail groove 35. Further, a dovetail pin portion is formed on a surface of each magnetic piece on another side in the circumferential direction, and the dovetail pin portions are laminated on one another to form a dovetail pin 36. The permanent magnets 32 are received in magnet receiving holes 34, and are firmly fixed through use of, for example, an adhesive as needed.

The five segment cores 31A annularly arranged in the circumferential direction are integrally coupled to one another through fitting of the dovetail pin 36 and the dovetail groove 35 while holding opposed side surfaces of adjacent segment cores 31A in the circumferential direction in abutment against each other. A division surface 37 being an abutment surface of the opposed side surfaces of adjacent segment cores 31A in the circumferential direction is formed on a flat plane including an axis center of the rotor core 5H. The division surface 37 is located at a center position in the circumferential direction between adjacent permanent magnets 32 having the same polarity.

The eighth embodiment has the same configuration as the second embodiment described above except that the rotor core 5H is used.

Also in the eighth embodiment, the rotor core 5H is divided into the five segment cores 31A, and the segment cores 31A are each manufactured by laminating magnetic pieces punched out in an arc shape. The annularly arranged segment cores 31A are integrally coupled to one another through fitting of the dovetail groove 35 and the dovetail pin 36 while holding side surfaces in the circumferential direction in abutment against each other. The division surface 37 is located at a center position in the circumferential direction between adjacent permanent magnets 32 having the same polarity. Thus, the number of segments of the rotor core 5H is not a divisor and a multiple of the greatest common divisor of the number of poles and the number of slots in the rotating electric machine.

Therefore, also in the eighth embodiment, the same effect as the second embodiment described above can be attained.

In the eighth embodiment, the magnetic fluxes generated by the permanent magnets 32 flow through the magnetic paths M indicated by the arrows in FIG. 14. In the rotor core 5H, the division surface 37 is formed on the flat plane, which passes through the center position of the permanent magnets 32 in the circumferential direction between the adjacent permanent magnets 32 having the same polarity and includes the axis center of the rotor core 5H. With this configuration, as illustrated in FIG. 14, the influence of the magnetic paths M being hindered by the division surface 37 is reduced, and a use ratio of magnetic fluxes generated by the permanent magnets 32 is enhanced, thereby being capable of increasing the torque.

Moreover, the rotor core 5H has the IPM structure. Thus, a magnet sectional area per magnetic pole is increased. Further, through use of reluctance torque, a magnetic density per sectional area is increased. Accordingly, torque can be improved.

Ninth Embodiment

Figure 15:
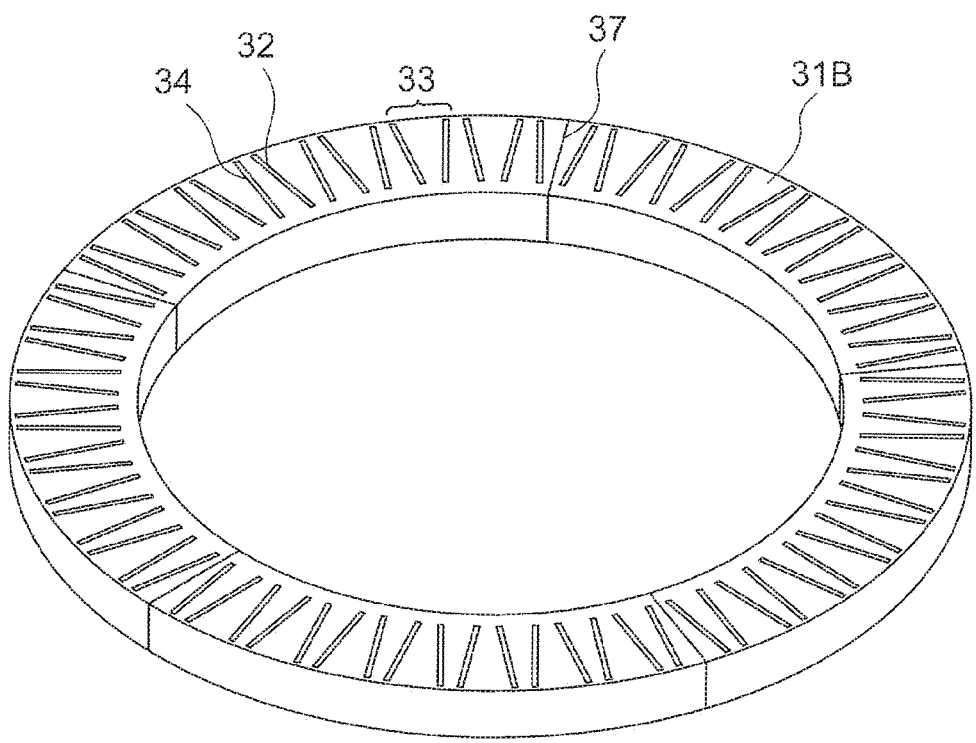
FIG. 15 is a perspective view for illustrating a rotor core of a rotating electric machine according to a ninth embodiment of the present invention.

FIG. 15 is a perspective view for illustrating a rotor core of a rotating electric machine according to a ninth embodiment of the present invention.

In FIG. 15, the dovetail groove and the dovetail pin are omitted from both side surfaces of a segment core 31B in the circumferential direction. A rotor core 5I is formed of five segment cores 31B annularly arranged in the circumferential direction. The five annularly arranged segment cores 31B are integrally coupled to one another by holding side surfaces thereof in the circumferential direction, with an adhesive applied thereon, in abutment against one another and curing the adhesive.

The ninth embodiment has the same configuration as the eighth embodiment except that the adjacent segment cores 31B are coupled to one another through use of the adhesive.

Therefore, also in the ninth embodiment, the same effect as the eighth embodiment can be attained.

Tenth Embodiment

Figure 16:
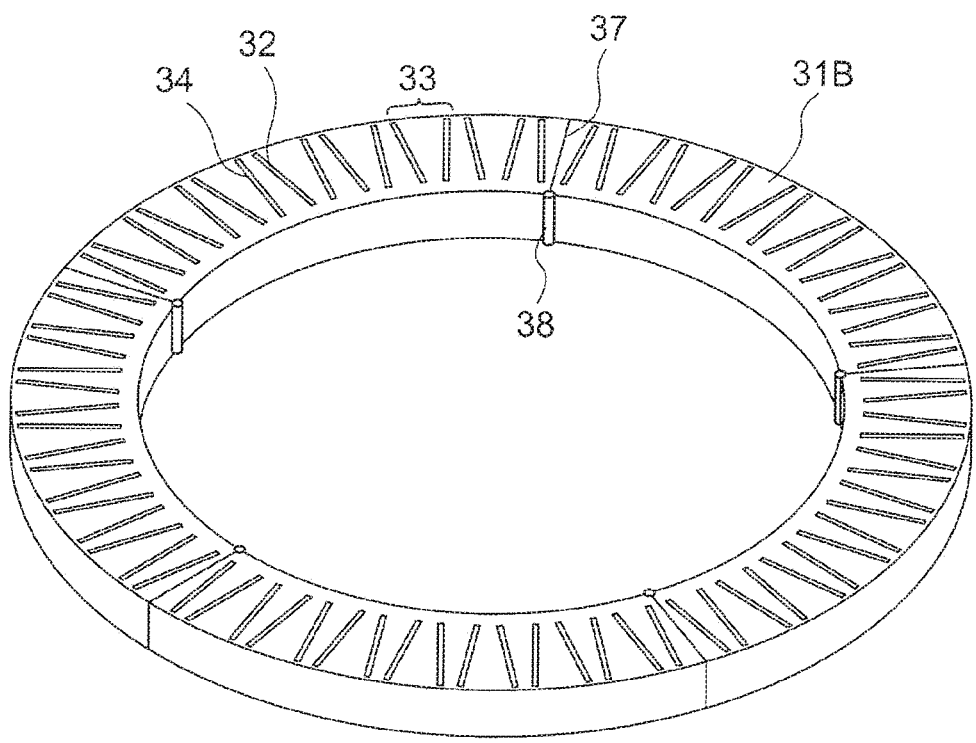
FIG. 16 is a perspective view for illustrating a rotor core of a rotating electric machine according to a tenth embodiment of the present invention.

FIG. 16 is a perspective view for illustrating a rotor core of a rotating electric machine according to a tenth embodiment of the present invention.

In FIG. 16, a rotor core 5J is formed of the five segment cores 31B annularly arranged in the circumferential direction. The five annularly arranged segment cores 31B are integrally coupled to one another by holding the side surfaces thereof in the circumferential direction in abutment against one another and welding inner peripheral portions of abutment portions along the entire length in the axial direction.

The tenth embodiment has the same configuration as the eighth embodiment except that the adjacent segment cores 31B are coupled to one another through use of a welding portion 38.

Therefore, also in the tenth embodiment, the same effect as the eighth embodiment can be attained.

Eleventh Embodiment

Figure 17:
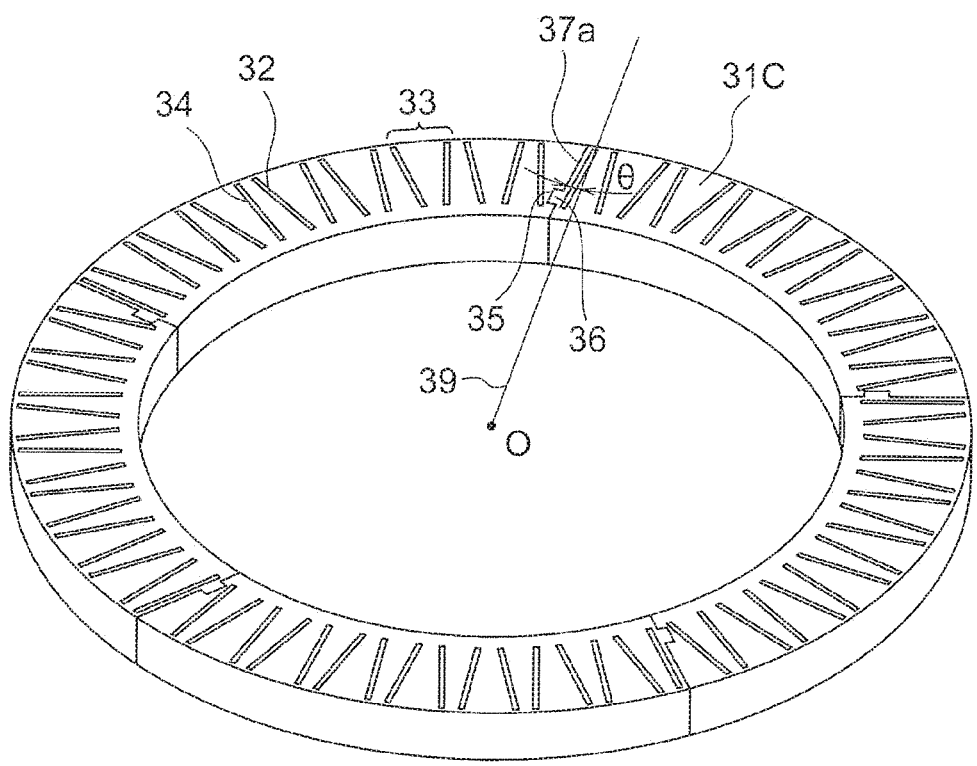
FIG. 17 is a perspective view for illustrating a rotor core of a rotating electric machine according to an eleventh embodiment of the present invention.

FIG. 17 is a perspective view for illustrating a rotor core of a rotating electric machine according to an eleventh embodiment of the present invention.

In FIG. 17, the dovetail groove 35 and the dovetail pin 36 are formed from both side surfaces of a segment core 31C in the circumferential direction. A rotor core 5K is formed of five segment cores 31C annularly arranged in the circumferential direction. The five annularly arranged segment cores 31C are integrally coupled to one another through fitting of the dovetail pin 36 and the dovetail groove 35 while holding opposed side surfaces of adjacent segment cores 31C in the circumferential direction in abutment against each other.

The segment cores 31C are obtained by equally dividing the rotor core 5K in the circumferential direction into five segments at division positions each corresponding to a position between adjacent permanent magnets 32 having the same polarity. The number of the magnetic poles of segment core 31C is 8. The division surface 37a is formed on a flat plane which is inclined by an angle θ toward one side in the circumferential direction with respect to a flat plane 39 including an axis center O of the rotor core 5K. The division surface 37a divides the magnetic pole 33, which is located between adjacent permanent magnets 39 having the same polarity, in the circumferential direction.

The eleventh embodiment has the same configuration as the eighth embodiment except that the division surface 37a of the rotor core 5K is formed on the flat plane inclined by the angle θ toward the one side in the circumferential direction with respect to the flat plane 39 including the axis center O of the rotor core 5K.

Also in the eleventh embodiment, the rotor core 5K is divided into five segment cores 31C, and the segment cores 31C are each manufactured by laminating magnetic pieces punched out into an arc shape. The segment cores 31C are integrally coupled to one another through fitting of the dovetail grooves 35 and the dovetail pins 36. Thus, the number of segments of the rotor core 5K is not a divisor and a multiple of the greatest common divisor of the number of poles and the number of slots in the rotating electric machine.

Therefore, also in the eleventh embodiment, the same effect as the eighth embodiment described above can be attained.

In the eighth to eleventh embodiments described above, two permanent magnets 32 form one magnetic pole 33. However, three or more permanent magnets 32 may form one magnetic pole 33. In this case, it only required that the division surface 37, 37a be formed between adjacent permanent magnets 32 having the same polarity.

Moreover, in the eighth to eleventh embodiments described above, the number of segments of the rotor core is 5. However, the number of segments of the rotor core is not limited to 5, and it is only required that the number of segments of the rotor core be not a divisor and a multiple of the greatest common divisor of the number of poles and the number of slots in the rotating electric machine.

Twelfth Embodiment

Figure 18:
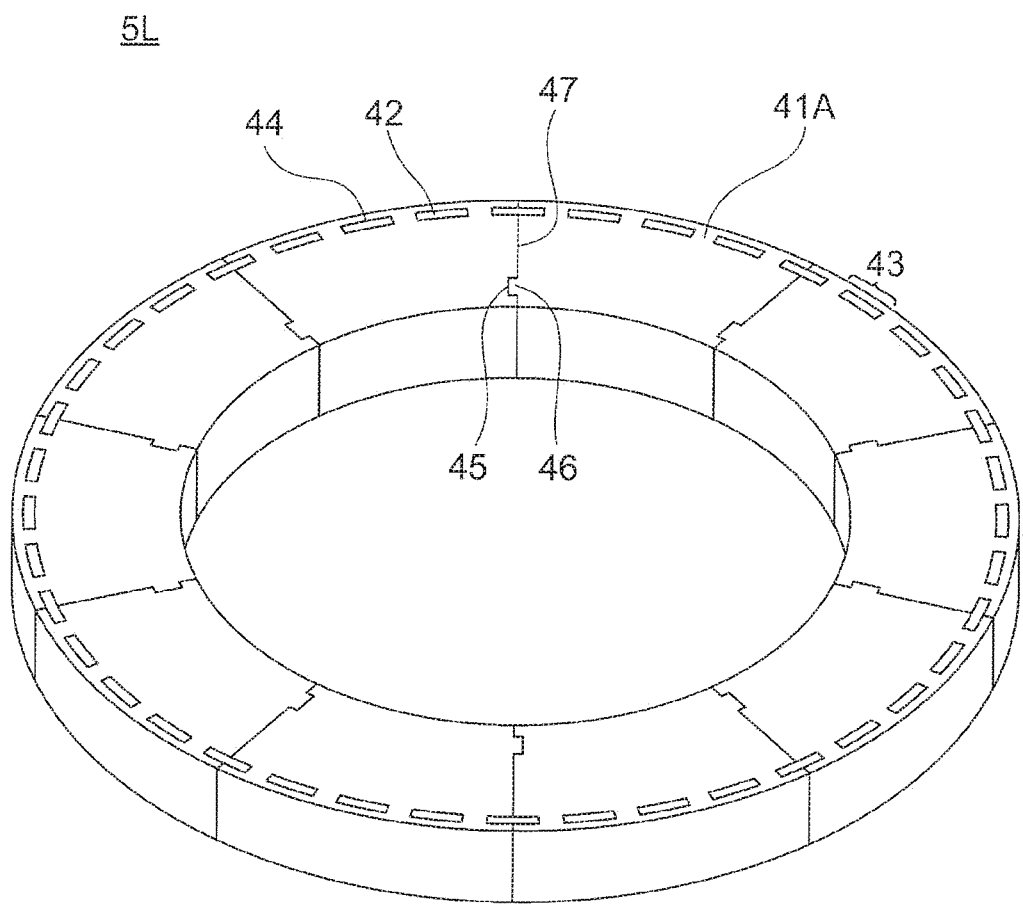
FIG. 18 is a perspective view for illustrating a rotor core of a rotating electric machine according to a twelfth embodiment of the present invention.

FIG. 18 is a perspective view for illustrating a rotor core of a rotating electric machine according to a twelfth embodiment of the present invention.

In FIG. 18, a rotor core 5L is a ring-shaped laminated core having a predetermined thickness. The rotor core 5L has a interior permanent magnet (IPM) structure having forty permanent magnets 42 embedded therein. The permanent magnets 42 are each formed into a rectangular parallelepiped having a length equal to a thickness of the rotor core 5L and having a rectangular section, and a length direction of a short side of the rectangular section is set as a magnetizing direction. The forty permanent magnets 42 are arranged at an equiangular pitch in the circumferential direction on the outer peripheral portion of the rotor core 5L so that a length direction of a short side of the rectangular section is a radial direction and polarities of the permanent magnets 42 on the radially outer sides are different polarities. Each of the permanent magnets 42 forms a magnetic pole 43. That is, the number of poles of the rotor is 40.

The rotor core 5L is formed of ten segment cores 41A annularly arranged in the circumferential direction. The segment cores 41A are obtained by equally dividing the rotor core 5L in the circumferential direction at division positions each corresponding to a center position in the circumferential direction between adjacent permanent magnets 42 having the same polarity. The number of magnetic poles of the segment core 41A is 4.

The segment cores 41A are each formed of a predetermined number of arc-shaped magnetic pieces punched out from a magnetic thin plate made of a soft magnetic material such as an electromagnetic steel sheet and laminated on one another. On this occasion, through holes are formed integrally with the magnetic pieces having been punched out, and the through holes are laminated on one another to form the magnet receiving holes 44. Further, a dovetail groove portion is formed in a surface of each magnetic piece on one side in the circumferential direction, and the dovetail groove portions are laminated on one another to form a dovetail groove 45. Further, a dovetail pin portion is formed on a surface of each magnetic piece on another side in the circumferential direction, and the dovetail pin portions are laminated on one another to form a dovetail pin 46. The permanent magnets 42 are received in magnet receiving holes 42, and are firmly fixed through use of, for example, an adhesive as needed.

The ten segment cores 41A annularly arranged in the circumferential direction are integrally coupled to one another through fitting of the dovetail pin 46 and the dovetail groove 45 while holding opposed side surfaces of adjacent segment cores 41A in the circumferential direction in abutment against each other. A division surface 47 being an abutment surface of the opposed side surfaces of adjacent segment cores 41A in the circumferential direction is formed on a flat plane including an axis center of the rotor core 51. The division surface 47 is located at a center position in the circumferential direction between adjacent permanent magnets 42 having the same polarity.

The second embodiment 2 has the same configuration as the first embodiment described above except that the rotor core 5A is used.

Also in the twelfth embodiment, the rotor core 5L has the IPM structure. The rotor core 5L is divided into the ten segment cores 41A, and the segment cores 41A are each manufactured by laminating magnetic pieces punched out in an arc shape. The annularly arranged segment cores 41A are integrally coupled to one another through fitting of the dovetail groove 45 and the dovetail pin 46 while holding side surfaces in the circumferential direction in abutment against each other. The division surface 47 is located at a center position in the circumferential direction between adjacent permanent magnets 42 having the same polarity. Thus, the number of segments of the rotor core 5L is not a divisor and a multiple of the greatest common divisor of the number of poles and the number of slots in the rotating electric machine.

Therefore, also in the twelfth embodiment, the same effect as the eighth embodiment described above can be attained.

In the rotor core 5L, the division surface 47 is formed on the flat plane, which passes through the center position of the permanent magnets 42 in the circumferential direction and includes the axis center of the rotor core 5L. With this configuration, the influence of the magnetic paths being hindered by the division surface 47 is reduced, and a use ratio of magnetic fluxes generated by the permanent magnets 42 is enhanced, thereby being capable of increasing the torque.

In the twelfth embodiment, one permanent magnet 42 forms one magnetic pole. Therefore, as compared to the eighth embodiment in which two permanent magnets 32 form one magnetic pole, the number of permanent magnets 42 can be reduced, thereby being capable of reducing manufacturing cost at the time of manufacture.

Thirteenth Embodiment

Figure 19:
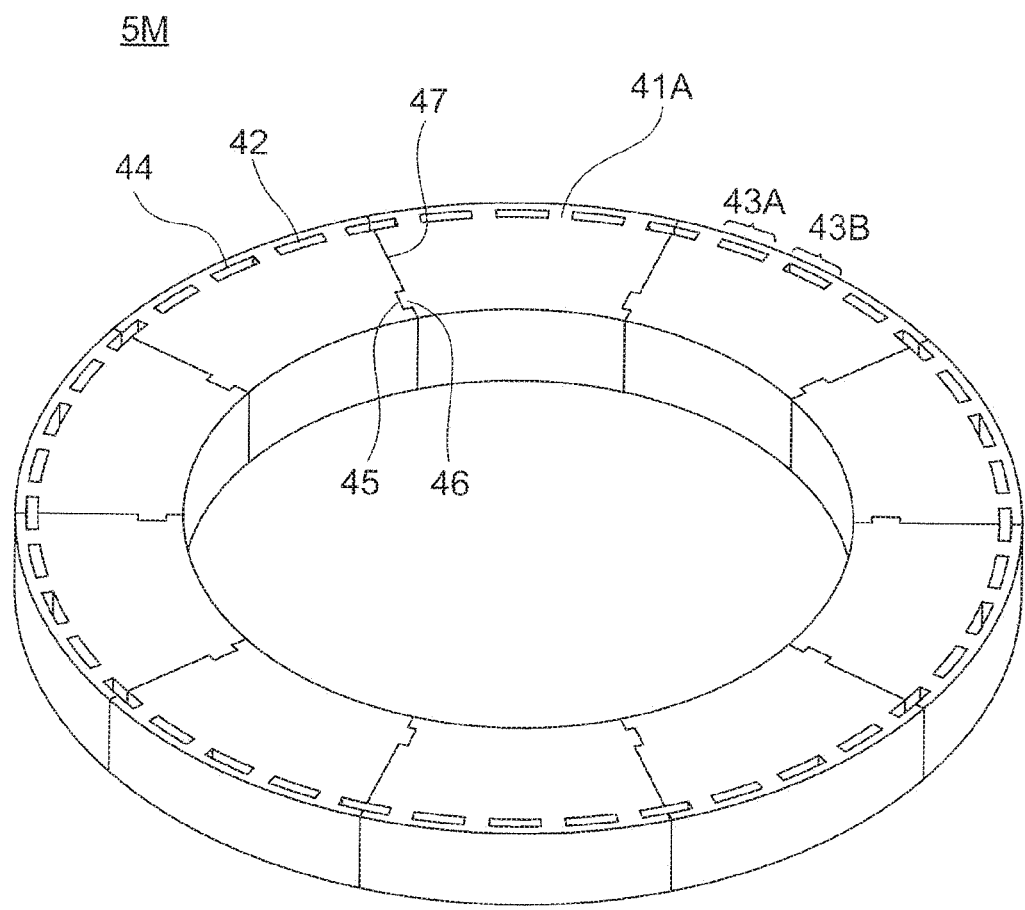
FIG. 19 is a perspective view for illustrating a rotor core of a rotating electric machine according to a thirteenth embodiment of the present invention.

FIG. 19 is a perspective view for illustrating a rotor core of a rotating electric machine according to a thirteenth embodiment of the present invention.

In FIG. 19, the permanent magnets 42 are received in every other magnet receiving hole 44 among forty magnet receiving holes 44 arranged in the circumferential direction so that, with the length direction of the short side of the rectangular section being a radial direction, polarities on radially outer sides are the same, and the permanent magnets 42 are firmly fixed through use of an adhesive as needed. The permanent magnets 42 serve as magnetic poles 43A, and each region between adjacent permanent magnets 42 serves as a magnetic pole 43B formed of a soft magnetic body. That is, the number of poles of the rotor is 40.

The rotor core 5M of the thirteenth embodiment has the same configuration as the rotor core 5L of the twelfth embodiment except that the permanent magnets 42 are received in every other magnet receiving hole 44.

Therefore, also in the thirteenth embodiment, the same effect as the twelfth embodiment can be attained.

The rotor core 5M has the IPM structure in which the permanent magnets 42 are embedded, as well as the consequent pole structure. Therefore, as compared to the twelfth embodiment, the number of permanent magnets 42 can be reduced by half, thereby being capable of further reducing processing cost at the time of manufacture.

Moreover, in the twelfth and thirteenth embodiments described above, the number of segments of the rotor core is 10. However, the number of segments of the rotor core is not limited to 10, and it is only required that the number of segments of the rotor core be not a divisor and a multiple of the greatest common divisor of the number of poles and the number of slots in the rotating electric machine.

Moreover, in the twelfth and thirteenth embodiments, the segment cores are coupled to one another through fitting of the dovetail groove and the dovetail pin. However, the segment cores may be coupled to one another through use of an adhesive or by welding.

Moreover, in the twelfth and thirteenth embodiments, the division surface of the rotor core is formed on the flat plane including the axis center of the rotor core. However, the division surface of the rotor core may be formed on a flat plane which is inclined by a predetermined angle toward one side in the circumferential direction with respect to a flat plane including the axis center of the rotor core.

Fourteenth Embodiment

Figure 20:
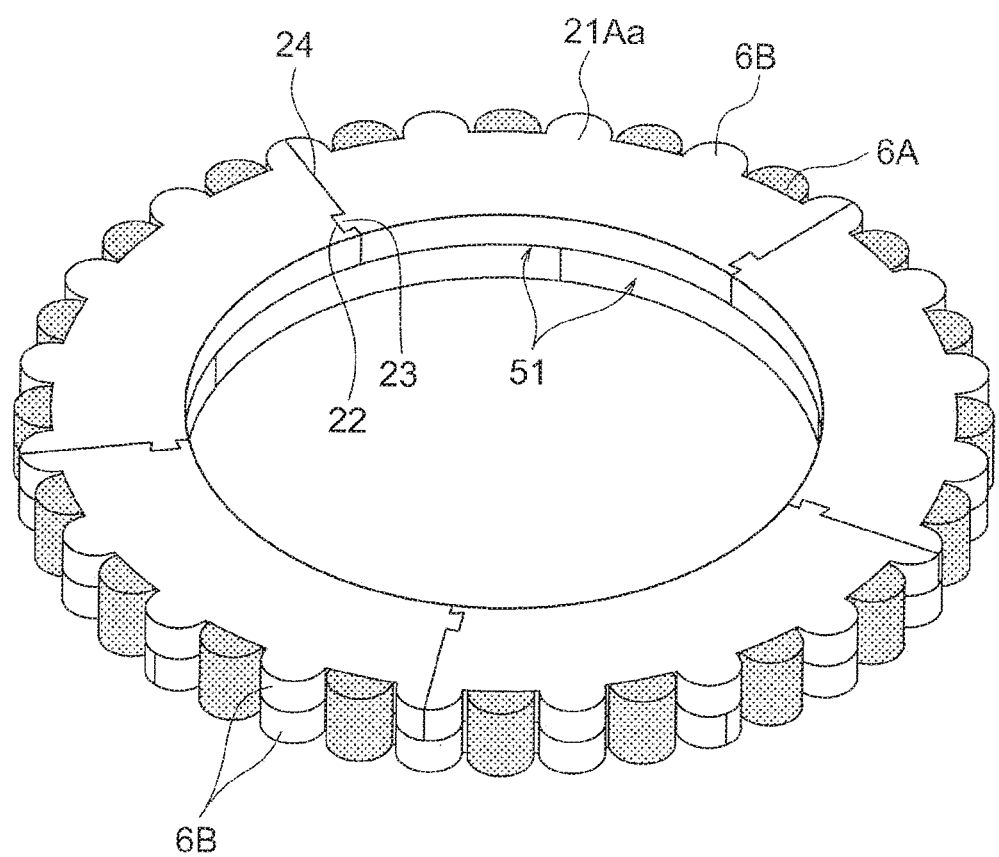
FIG. 20 is a perspective view for illustrating a rotor core of a rotating electric machine according to a fourteenth embodiment of the present invention.

FIG. 20 is a perspective view for illustrating a rotor core of a rotating electric machine according to a fourteenth embodiment of the present invention.

In FIG. 20, segment rotor cores 51 have a configuration in which segment core portions 21Aa, each having a configuration obtained by dividing the segment core 21A into two segments in the axial direction, are arranged in the circumferential direction. In the rotor core 5N, the division surfaces 24 are shifted in the circumferential direction, and two segment rotor cores 51 are laminated on one another, with the magnetic poles 6A stacked on one another and the magnetic poles 6B stacked on one another.

In the fourteenth embodiment, other configurations are the same as those of the second embodiment described above, and hence the effect same as the second embodiment can be attained.

According to the fourteenth embodiment, the division surfaces 24 of the two segment rotor cores 51 laminated in the axial direction are shifted in the circumferential direction. Therefore, the phases of the harmonic component of the magnetomotive force generated through the division of the segment rotor cores 51 in the circumferential direction differ for each of the segment rotor cores 51, and hence the torque ripple can be further reduced.

Fifteenth Embodiment

Figure 21:
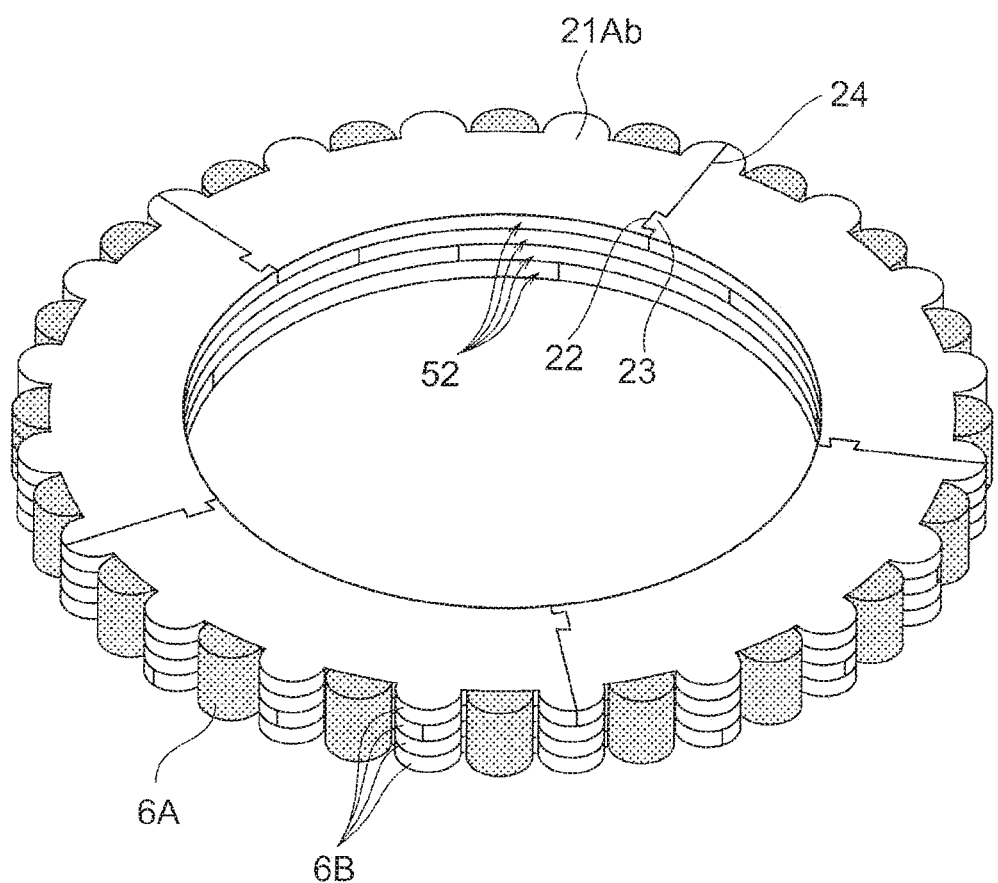
FIG. 21 is a perspective view for illustrating a rotor core of a rotating electric machine according to a fifteenth embodiment of the present invention.

FIG. 21 is a perspective view for illustrating a rotor core of a rotating electric machine according to a fifteenth embodiment of the present invention.

In FIG. 21, segment rotor cores 52 have a configuration in which segment core portions 21Aa, each having a configuration obtained by dividing the segment core 21A into four segments in the axial direction, are arranged in the circumferential direction. In the rotor core 5O, the division surfaces 24 are shifted in the circumferential direction, and four segment rotor cores 52 are laminated on one another, with the magnetic poles 6A stacked on one another and the magnetic poles 6B stacked on one another.

In the fifteenth embodiment, other configurations are the same as those of the second embodiment described above, and hence the effect same as the second embodiment can be attained.

According to the fifteenth embodiment, the division surfaces 24 of the four segment rotor cores 52 laminated in the axial direction are shifted in the circumferential direction. Therefore, the phases of the harmonic component of the magnetomotive force generated through the division of the segment rotor cores 52 in the circumferential direction differ for each of the segment rotor cores 52, and hence the torque ripple can be further reduced.

Sixteenth Embodiment

Figure 22:
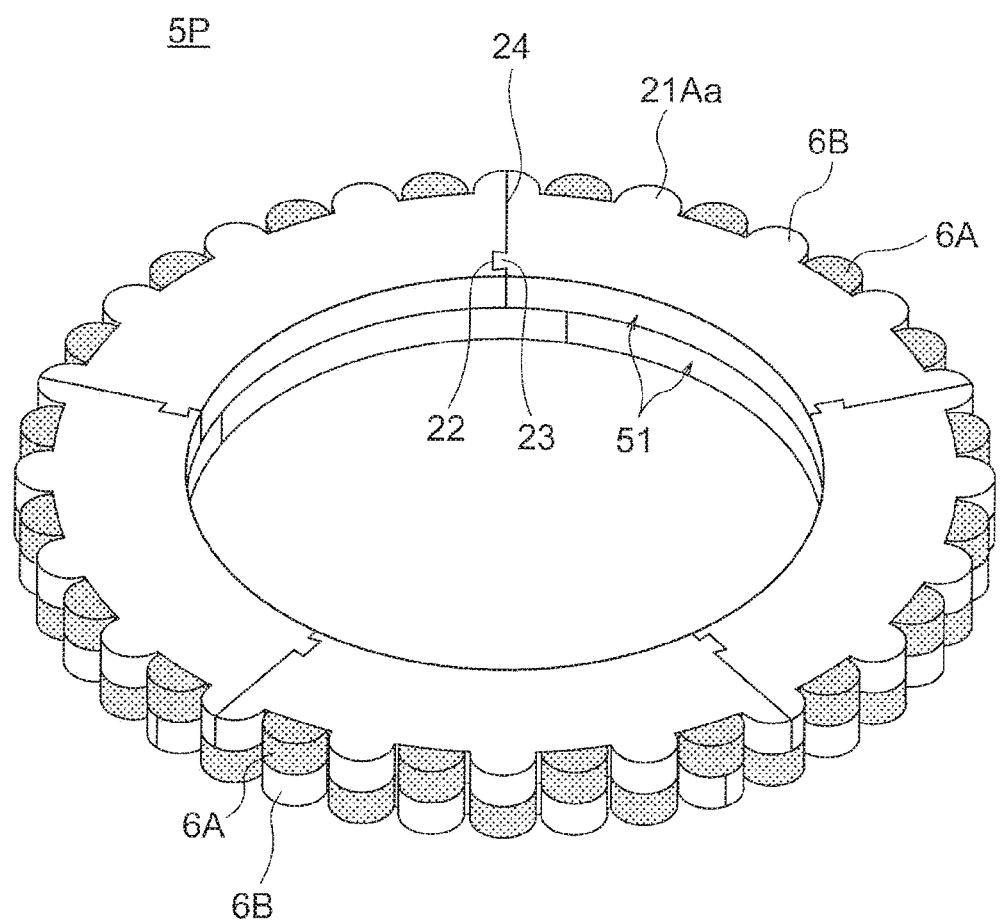
FIG. 22 is a perspective view for illustrating a rotor core of a rotating electric machine according to a sixteenth embodiment of the present invention.

FIG. 22 is a perspective view for illustrating a rotor core of a rotating electric machine according to a sixteenth embodiment of the present invention.

In FIG. 22, the rotor core 5P has a configuration in which the division surfaces 24 are shifted in the circumferential direction, and the two segment rotor cores 51 are laminated on one another with the magnetic poles 6A and the magnetic poles 6B stacked on one another. The permanent magnets forming the magnetic poles 6A on one segment rotor core 51 are magnetized, for example, so as to have an N pole on the radially inner side and an S pole on the radially outer side. The permanent magnets forming the magnetic poles 6A on another segment rotor core 51 are magnetized, for example, so as to have an S pole on the radially inner side and an N pole on the radially outer side. The magnetic pole 6A and the magnetic pole 6B stacked on one another form one pole. That is, the number of poles of the rotor is 40.

In the sixteenth embodiment, other configurations are the same as those of the fourteenth embodiment described above, and hence the effect same as the fourteenth embodiment can be attained.

Moreover, according to the sixteenth embodiment, the magnetic poles 6A each formed of a permanent magnet and the magnetic poles 6B each formed of a soft magnetic body are stacked on one another in the axial direction. As described above, through the stacking of the magnetic poles made of different materials in the axial direction, the magnetomotive force generated by each pole becomes uniform, thereby being capable of further reducing the torque ripple.

In the sixteenth embodiment described above, although the segment rotor cores 51 are laminated on one another with the magnetic poles 6A and the magnetic poles 6B stacked on one another in the axial direction in the fourteenth embodiment, even when the segment rotor cores 52 are laminated on one another with the magnetic poles 6A and the magnetic poles 6B stacked on one another alternately in the axial direction in the fifteenth embodiment, the same effect can be attained.

Moreover, in the fourteenth to sixteenth embodiments described above, the segment rotor cores are laminated in two stages or four stages. However, the number of stages of the segment rotor cores to be laminated is not limited to those.

Moreover, in the fourteenth to sixteenth embodiments described above, the segment rotor cores having the configuration obtained by dividing the rotor core of the second embodiment described above into two segments or four segments in the axial direction is used. However, a segment rotor core having a configuration obtained by dividing the rotor core of the third to seventh embodiments into two segments or four segments in the axial direction may be used.

Seventeenth Embodiment

Figure 23:
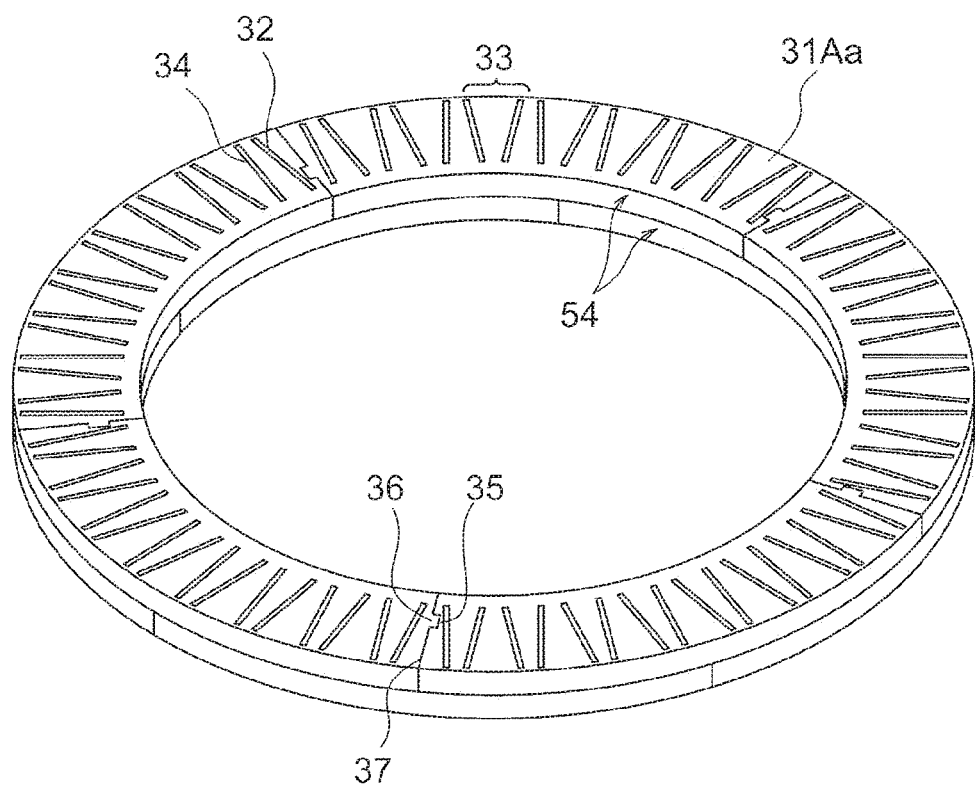
FIG. 23 is a perspective view for illustrating a rotor core of a rotating electric machine according to a seventeenth embodiment of the present invention.

FIG. 23 is a perspective view for illustrating a rotor core of a rotating electric machine according to a seventeenth embodiment of the present invention.

In FIG. 23, segment rotor cores 54 have a configuration in which segment core portions 31Aa, each having a configuration obtained by dividing the segment core 31A into two segments in the axial direction, are arranged in the circumferential direction. In the rotor core 5Q, the division surfaces 37 are shifted in the circumferential direction, and two segment rotor cores 54 are laminated on one another, with the magnetic poles 33 having the same polarity stacked on one another.

In the seventeenth embodiment, other configurations are the same as those of the eighth embodiment described above, and hence the effect same as the eighth embodiment can be attained.

According to the seventeenth embodiment, the division surfaces 37 of the two segment rotor cores 54 laminated in the axial direction are shifted in the circumferential direction. Therefore, the phases of the harmonic component of the magnetomotive force generated through the division of the segment rotor cores 54 in the circumferential direction differ for each of the segment rotor cores 54, and hence the torque ripple can be further reduced.

Eighteenth Embodiment

Figure 24:
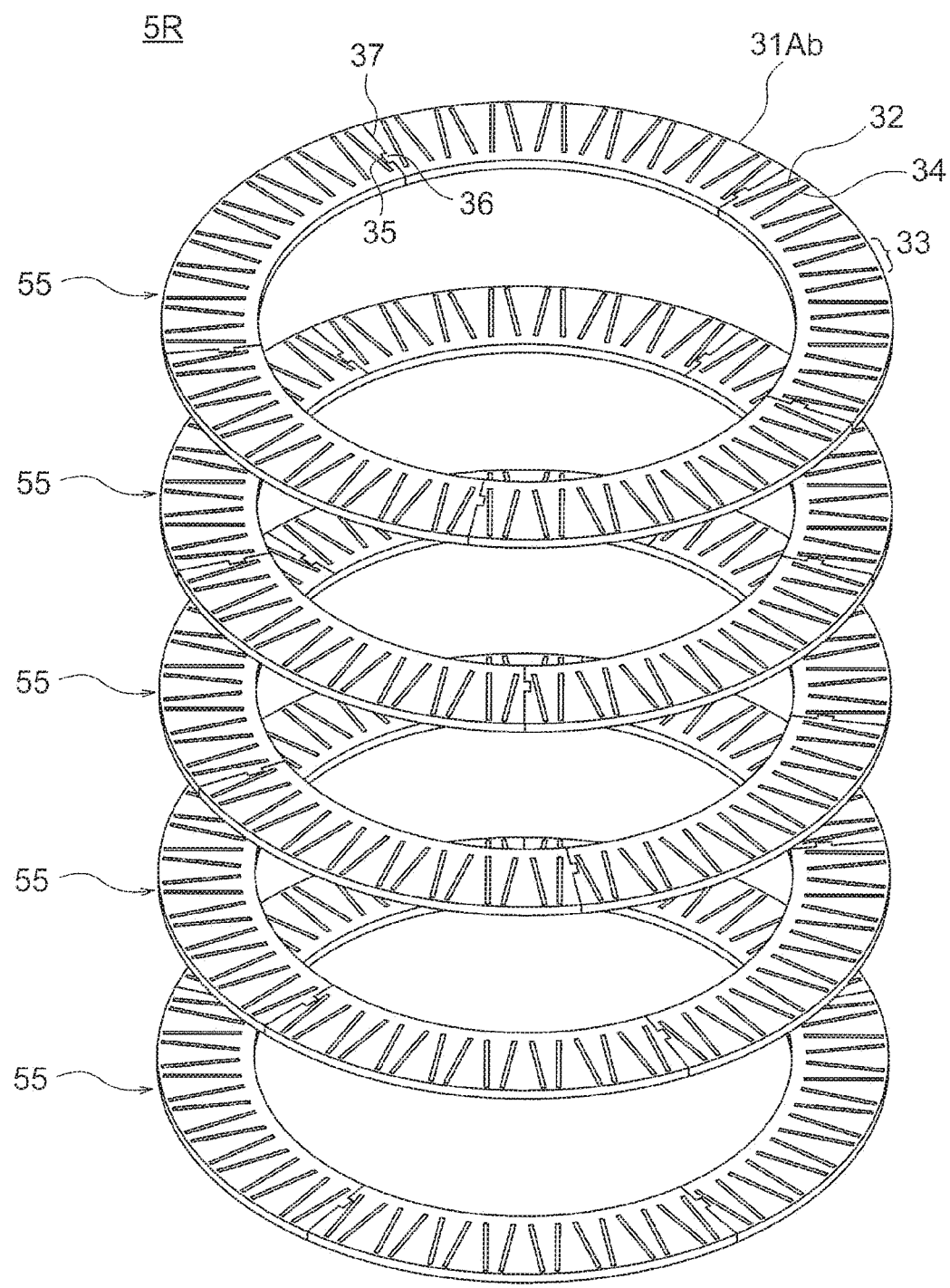
FIG. 24 is an exploded perspective view for illustrating a rotor core of a rotating electric machine according to an eighteenth embodiment of the present invention.

FIG. 24 is a perspective view for illustrating a rotor core of a rotating electric machine according to a eighteenth embodiment of the present invention.

In FIG. 24, segment rotor cores 55 have a configuration in which segment core portions 31Aa, each having a configuration obtained by dividing the segment core 31A into five segments in the axial direction, are arranged in the circumferential direction. In the rotor core 5R, the division surfaces 37 are shifted in the circumferential direction, and five segment rotor cores 55 are laminated on one another, with the magnetic poles 33 having the same polarity stacked on one another.

In the eighteenth embodiment, other configurations are the same as those of the eighth embodiment described above, and hence the effect same as the eighth embodiment can be attained.

According to the eighteenth embodiment, the division surfaces 37 of the five segment rotor cores 55 laminated in the axial direction are shifted in the circumferential direction. Therefore, the phases of the harmonic component of the magnetomotive force generated through the division of the segment rotor cores 55 in the circumferential direction differ for each of the segment rotor cores 55, and hence the torque ripple can be further reduced.

In the eighteenth embodiment described above, the division surfaces of the five segment rotor cores stacked in the axial direction are shifted toward one side in the circumferential direction in the order of arrangement in the axial direction. However, it is only required that a circumferential position of the division surfaces of at least one group among the groups of the segment rotor cores 55 adjacent to each other in the axial direction be different. For example, the division surface of the segment rotor core in the second layer may be shifted toward one side in the circumferential direction with respect to the division surface of the segment rotor core in the first layer, the circumferential positions of the division surfaces of the segment rotor cores in the third layer and the fifth layer may be matched with the circumferential position of the division surface of the segment rotor core in the first layer, and the circumferential position of the division surface of the segment rotor core in the fourth layer may be matched with the circumferential position of the division surface of the segment rotor core in the second layer.

Moreover, the circumferential positions of the division surfaces of the segment rotor cores in the first to fourth layers may be matched with each other, and the circumferential position of the division surface of the segment rotor core in the fifth layer may be shifted in the circumferential direction with respect to the circumferential position of the division surface of the segment rotor core in the fourth layer. In this case, when orientations of the dovetail grooves and the dovetail pins in a group of the segment rotor cores adjacent to each other in the axial direction, which are matched with each other in the circumferential positions of the division surface, are set different from each other, the phases of the harmonic component of the magnetomotive force generated through the division of the segment rotor core 55 in the circumferential direction differ for each segment rotor core 55, thereby being capable of reducing the torque ripple.

Moreover, in the seventeenth and eighteenth embodiments described above, the segment rotor cores are laminated in two stages or five stages. However, the number of stages of the segment rotor cores to be laminated is not limited to those.

Moreover, in the seventeenth and eighteenth embodiments described above, the segment rotor cores having the configuration obtained by dividing the rotor core of the eighteenth embodiment described above into two segments or five segments in the axial direction is used. However, a segment rotor core having a configuration obtained by dividing the rotor core of the ninth to thirteenth embodiments into two segments or five segments in the axial direction may be used.

Nineteenth Embodiment

Figure 25:
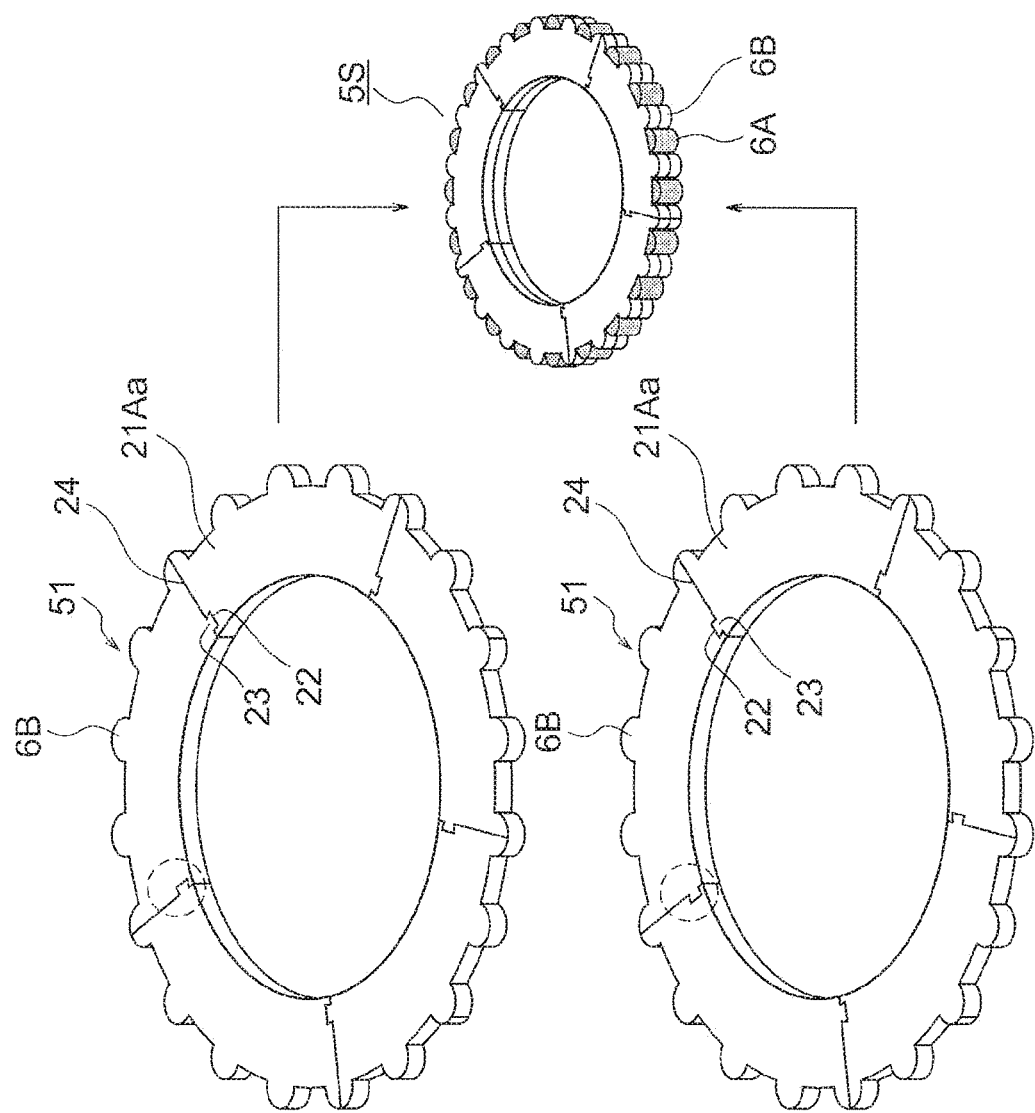
FIG. 25 is an explanatory perspective view for illustrating a configuration of a rotor core of a rotating electric machine according to a nineteenth embodiment of the present invention.

FIG. 25 is an explanatory perspective view for illustrating a configuration of a rotor core of a rotating electric machine according to a nineteenth embodiment of the present invention.

In FIG. 25, a rotor core 5S is formed by laminating two segment rotor cores 51, with the front and back of the segment rotor core 51 being changed, the division surfaces 24 being matched, the magnetic poles 6A being stacked on one another and the magnetic poles 6B being stacked on one another. In FIG. 25, as indicated by the dotted circle, orientations of the dovetail grooves 22 and the dovetail pins 23 of the two stacked segment rotor cores 51 are opposite.

In the nineteenth embodiment, other configurations are the same as those of the second embodiment described above, and hence the effect same as the second embodiment can be attained.

According to the nineteenth embodiment, the orientations of the dovetail grooves 22 and the dovetail pins 23 of the two segment rotor cores 51 laminated in the axial direction are opposite. Therefore, the phases of the harmonic component of the magnetomotive force generated through the division of the segment rotor cores 51 in the circumferential direction differ for each of the segment rotor cores 51, and hence the torque ripple can be further reduced.

The rotor core 5S is formed by laminating the two segment rotor core 51 with the front and back of the segment rotor cores 51 being changed. Therefore, the influence of the plate thickness deviation which may occur at the time of manufacture of the segment rotor cores 51 can be cancelled out, thereby being capable of further reducing the torque ripple.

In the nineteenth embodiment described above, the segment rotor cores 51 are laminated on one another with the magnetic poles 6A, each formed of a permanent magnet, stacked on one another in the axial direction and the magnetic poles 6B, each formed of a soft magnetic body, stacked on one another in the axial direction. However, the segment rotor cores 51 may be laminated on one another so that the magnetic poles 6A and the magnetic poles 6B are stacked on one another in the axial direction.

Further, in the nineteenth embodiment described above, the segment rotor cores 51 are laminated so that the division surfaces 24 are matched with each other. However, the segment rotor cores 51 may be laminated on one another so that the division surfaces 24 are shifted in the circumferential direction.

Moreover, in the nineteenth embodiments described above, the segment rotor cores having the configuration obtained by equally dividing the rotor core of the second embodiment described above into two segments in the axial direction is used. However, a segment rotor core having a configuration obtained by equally dividing the rotor core of the fifth to seventh embodiments into two segments in the axial direction may be used.

In the nineteenth embodiment described above, the segment rotor cores are laminated in two stages. However, the number of stages of the segment rotor cores to be laminated is not limited to those.

Twentieth Embodiment

Figure 26:
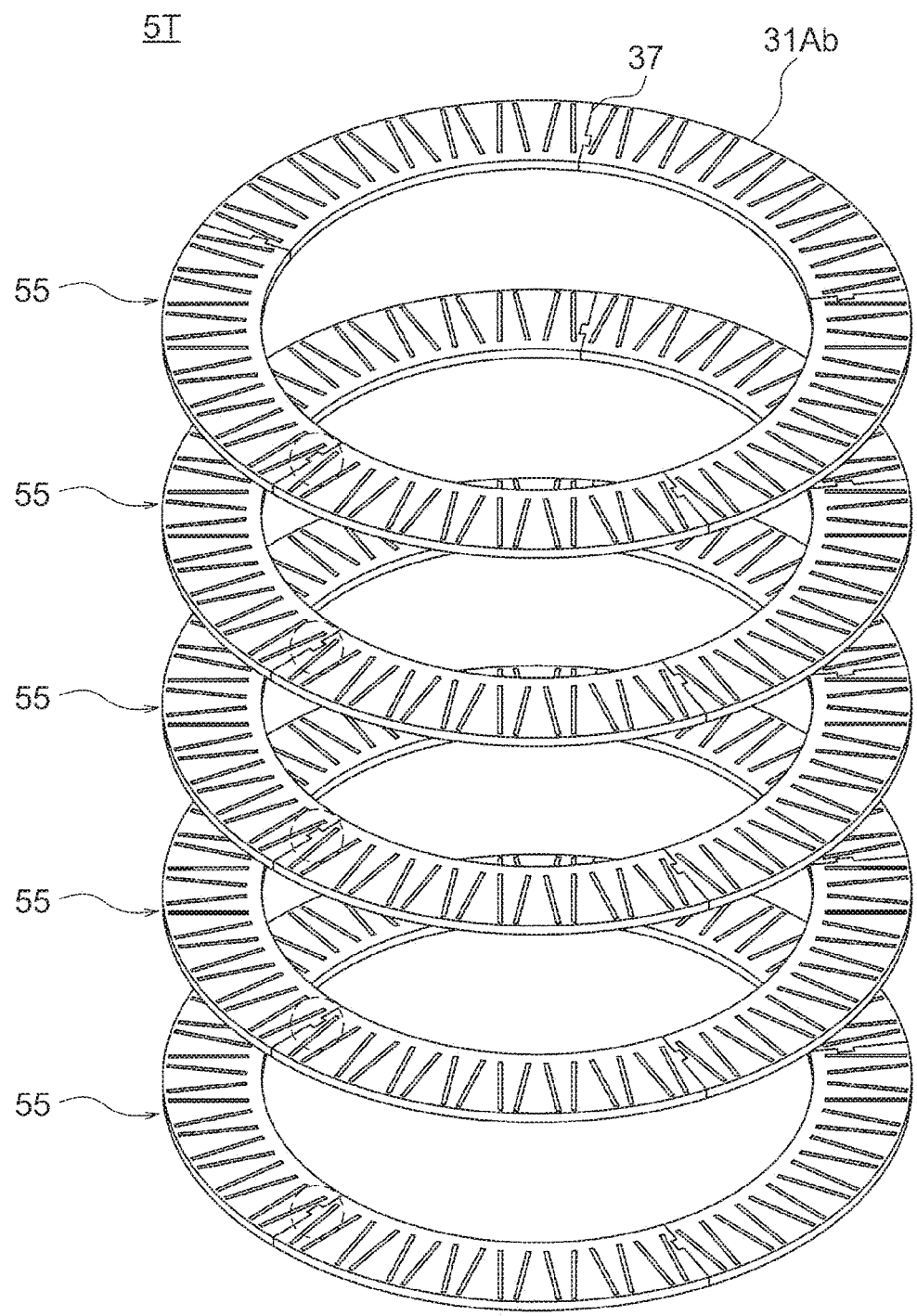
FIG. 26 is an exploded perspective view for illustrating a rotor core of a rotating electric machine according to a twentieth embodiment of the present invention.

FIG. 26 is an exploded perspective view for illustrating a rotor core of a rotating electric machine according to a twentieth embodiment of the present invention.

In FIG. 26, a rotor core 5T is formed by laminating five segment rotor cores 55, with the front and back of the segment rotor cores 55 being alternately changed, the division surfaces 37 being matched with one another, and the magnetic poles 33 having the same polarity being stacked on one another. In FIG. 26, as indicated by the dotted circle, orientations of the dovetail grooves 35 and the dovetail pins 36 of the five stacked segment rotor cores 51 are opposite alternately in the axial direction.

In the twentieth embodiment, other configurations are the same as those of the eighteenth embodiment described above, and hence the effect same as the eighteenth embodiment can be attained.

According to the twentieth embodiment, orientations of the dovetail grooves 35 and the dovetail pines 36 of the five segment rotor cores 55 are opposite alternately in the axial direction. With this, the phases of the harmonic component of the magnetomotive force generated through the division of the segment rotor core 55 in the circumferential direction are different for each segment rotor core 55, thereby being capable of further reducing the torque ripple.

Further, in the twentieth embodiment described above, the segment rotor cores 55 are laminated so that the circumferential positions of the division surfaces 37 are matched with each other. However, the segment rotor cores 55 may be laminated so that the circumferential positions of the division surfaces 37 are shifted in the circumferential direction.

Moreover, in the twentieth embodiment described above, orientations of the dovetail grooves 35 and the dovetail pins 36 of groups of the segment rotor cores 55 adjacent to each other in the axial direction are opposite. However, it is only required that the dovetail grooves 35 and the dovetail pins 36 of at least one group of the segment rotor cores 55 adjacent to each other in the axial direction be opposite. In this case, when the circumferential positions of the division surfaces 37 of the group of the segment rotor cores 55 adjacent to each other in the axial direction with the orientations of the dovetail grooves 35 and the dovetail pins 36 being opposite are matched with each other, and the circumferential positions of the division surfaces 37 of another group of the segment rotor cores 55 adjacent to each other in the axial direction are shifted in the circumferential direction, the phases of the harmonic component of the magnetomotive force generated through division of the segment rotor cores 55 in the circumferential direction differ for each segment rotor core 55, thereby being capable of reducing the torque ripple.

Moreover, in the twentieth embodiments described above, the segment rotor cores having the configuration obtained by equally dividing the rotor core of the eighth embodiment described above into five segments in the axial direction is used. However, a segment rotor core having a configuration obtained by equally dividing the rotor core of the eleventh to thirteenth embodiments into two segments in the axial direction may be used.

In the twentieth embodiment described above, the segment rotor cores are laminated in five stages. However, the number of stages of the segment rotor cores to be laminated is not limited to those.

Further, in each of the embodiments described above, the rotor core is formed of a laminated core obtained by laminating and integrating magnetic pieces each made of a soft magnetic material. However, the rotor core may be formed of a bulk core manufactured with a bulk body made of a soft magnetic material.

Moreover, in each of the embodiments described above, description is made of the stator coil formed of concentrated winding coils. However, the stator coils may be formed of distribution winding coils which are arranged in the number which is the same as the number of slots in the stator core at one-slot pitch.

Moreover, in each of the embodiments described above, description is made of the 40-pole 36-slot rotating electric machine or the 40-pole 48-slot rotating electric machine. However, as long as the number of segments of the rotor core is different from a divisor and a multiple of the greatest common divisor of the number of poles and the number of slots, combinations of the number of poles and the number of slots are not limited to those.

Moreover, in each of the embodiments described above, description is made of the rotating electric machine of the inner rotation type in which the rotor core is arranged on an inner peripheral side of the stator. However, even when the present invention is applied to a rotating electric machine of an outer rotation type in which the rotor core is arranged on an outer peripheral side of the stator, the same effect can be attained.

REFERENCE SIGNS LIST 2 shaft, 5, 5A, 5B, 5C, 5D, 5E, 5F, 5G, 5H, 5I, 5J, 5K, 5L, 5M, 5N, 5O, 5P, 5Q, 5R, 5S, 5T rotor core, 6, 6A, 6B magnetic pole, 10 stator, 11 stator core, 11a core back, 11b teeth, 12 slot, 13 stator coil, 20 rotor, 21, 21A, 21B, 21D, 21E, 21F segment core, 21Aa, 21Ab segment core portion, 22 dovetail groove, 23 dovetail pin, 24, 24a division surface, 31A, 31B, 31C segment core, 31Aa, 31Ab segment core portion, 32 permanent magnet, 33 magnetic pole, 35 dovetail groove, 36 dovetail pin, 37 division surface, 41A segment core, 42 permanent magnet, 43, 43A, 43B magnetic pole, 45 dovetail groove, 46 dovetail pin, 47 division surface, 51, 52, 54, 55 segment rotor core

The invention claimed is:
1. A rotating electric machine, comprising:
a stator including
an annular core back, and
a plurality of teeth projecting in a radial direction from the core back and being arranged in a circumferential direction, the plurality of teeth having slots each formed between the plurality of teeth adjacent to each other in the circumferential direction; and
a rotor including
an annular rotor core which is arranged coaxially with the stator through a magnetic gap and is rotatable, and
a plurality of magnetic poles arranged on the rotor core in the circumferential direction,
wherein the rotor core includes a plurality of segment cores formed by dividing the rotor core in the circumferential direction at division surfaces,
wherein the number of segments of the rotor core is different from a divisor and a multiple of the greatest common divisor of the number of poles of the rotor and the number of slots,
wherein the plurality of segment cores are coupled to each other through fitting of a dovetail groove and a dovetail pin,
wherein a fitting portion between the dovetail groove and the dovetail pin is located on a side opposite to the magnetic gap on a circle having a diameter that corresponds to an average value of an inner diameter and an outer diameter of the rotor core and having a circle center at an axis center of the rotor core.

2. The rotating electric machine according to claim 1, wherein the plurality of segment cores are formed into the same shape and are arranged at an equal pitch in the circumferential direction, and the plurality of segment cores each include two or more magnetic poles.

3. The rotating electric machine according to claim 1,
wherein the plurality of segment cores are held in abutment against each other at the division surface and are annularly arranged,
wherein at least some of the magnetic poles are magnetic poles each formed of a permanent magnet, and
wherein the division surface is formed in a circumferential region between the permanent magnets being adjacent to each other in the circumferential direction and having the same polarity.

4. The rotating electric machine according to claim 1,
wherein the plurality of segment cores are held in abutment against each other at the division surface and are annularly arranged,
wherein the plurality of magnetic poles include:
magnetic poles each formed of a permanent magnet; and
magnetic poles each formed of a soft magnetic body,
wherein the division surface is formed in a circumferential region between the permanent magnets being adjacent to each other in the circumferential direction and having the same polarity.

5. The rotating electric machine according to claim 1,
wherein the plurality of segment cores are held in abutment against each other at the division surface and are annularly arranged,
wherein a plurality of permanent magnets are embedded in the rotor core and are arranged in the circumferential direction, and
wherein the plurality of magnetic poles are each formed of two or more permanent magnets which are sequentially arranged in the circumferential direction.

6. The rotating electric machine according to claim 1,
wherein the rotor core is formed of an "n" number ("n" is an integer equal to or larger than 2) of segment rotor cores laminated in an axial direction,
wherein the "n" number of segment rotor cores are each formed of a plurality of segment core portions, which are each formed by dividing each of the plurality of segment cores into an "n" number of segments in the axial direction, held in abutment against each other and annularly arranged, and
wherein division positions of at least one group among groups of segment rotor cores adjacent to each other in the axial direction are different from each other in the circumferential direction.

7. The rotating electric machine according to claim 6, wherein the "n" number of segment rotor cores are laminated so that magnetic poles adjacent to each other in the axial direction have the same polarity.

8. A rotating electric machine, comprising:
a stator including
an annular core back, and
a plurality of teeth projecting in a radial direction from the core back and being arranged in a circumferential direction, the plurality of teeth having slots each formed between the plurality of teeth adjacent to each other in the circumferential direction; and
a rotor including
an annular rotor core which is arranged coaxially with the stator through a magnetic gap and is rotatable, and
a plurality of magnetic poles arranged on the rotor core in the circumferential direction,
wherein the rotor core includes a plurality of segment cores formed by dividing the rotor core in the circumferential direction at division surfaces,
wherein the number of segments of the rotor core is different from a divisor and a multiple of the greatest common divisor of the number of poles of the rotor and the number of slots
wherein the rotor core is formed of an "n" number ("n" is an integer equal to or larger than 2) of annular segment rotor cores laminated in the axial direction,
wherein the "n" number of segment rotor cores are each formed of a plurality of segment core portions, which are each formed by dividing each of the plurality of segment cores into an "n" number of segments in the axial direction, held in abutment against each other and annularly arranged,
wherein the segment core portions adjacent to each other in the circumferential direction are coupled to each other through fitting of a dovetail groove and a dovetail pin, and
wherein orientations of a fitting portion of the dovetail groove and the dovetail pin of at least one group among groups of segment rotor cores adjacent to each other in the axial direction are different from each other.

* * * * *